US012595430B2

(12) United States Patent
Gaber et al.

(10) Patent No.: US 12,595,430 B2
(45) Date of Patent: *Apr. 7, 2026

(54) WASTE TO ENERGY SYSTEM AND PROCESS FOR SOLID WASTE FEEDSTOCK

(71) Applicants: Janak H Handa, Toronto (CA); Hossam Gaber, North York (CA)

(72) Inventors: Hossam Gaber, North York (CA); Emmanuel Galiwango, Oshawa (CA); Mustafa Abdalmejeed Mansour Aldeeb, Oshawa (CA); Sharif Abu Darda, Oshawa (CA)

(73) Assignees: Janak H. Handa, Toronto (CA); Hossam Gaber, North York (CA)

( * ) Notice: Subject to any disclaimer, the term of this patent is extended or adjusted under 35 U.S.C. 154(b) by 441 days.

This patent is subject to a terminal disclaimer.

(21) Appl. No.: 18/460,161

(22) Filed: Sep. 1, 2023

(65) Prior Publication Data

US 2023/0416623 A1      Dec. 28, 2023

Related U.S. Application Data

(62) Division of application No. 17/663,409, filed on May 13, 2022, now Pat. No. 11,773,340.

(51) Int. Cl.
| | |
|---|---|
| *C10J 3/72* | (2006.01) |
| *C10J 3/18* | (2006.01) |
| *C10J 3/82* | (2006.01) |

(52) U.S. Cl.
CPC ................. *C10J 3/723* (2013.01); *C10J 3/18* (2013.01); *C10J 3/82* (2013.01); *B01J 2219/0898* (2013.01); *C10J 2200/09* (2013.01); *C10J 2300/0946* (2013.01); *C10J 2300/1238* (2013.01); *C10J 2300/1659* (2013.01)

(58) Field of Classification Search
CPC   C10J 3/723; C10J 2300/0946; C10J 2200/09; C10J 2300/1238; C10J 3/18
See application file for complete search history.

(56) References Cited

U.S. PATENT DOCUMENTS

| | | | | |
|---|---|---|---|---|
| 6,294,764 B1 * | 9/2001 | Lindner | .................... | F23G 5/50 |
| | | | | 219/121.48 |
| 10,099,200 B1 * | 10/2018 | Chandran | ................ | C10G 2/30 |
| 2008/0147241 A1 * | 6/2008 | Tsangaris | ............... | C10K 1/101 |
| | | | | 700/273 |
| 2008/0202028 A1 | 8/2008 | Tsangaris et al. | | |
| 2010/0242354 A1 * | 9/2010 | Perkins | ................... | C01B 3/384 |
| | | | | 252/373 |
| 2011/0289845 A1 | 12/2011 | Davis et al. | | |
| 2018/0057760 A1 * | 3/2018 | Chandran | ................ | C01B 3/02 |

(Continued)

*Primary Examiner* — Imran Akram
(74) *Attorney, Agent, or Firm* — Aird & McBurney LP

(57) ABSTRACT

A waste conversion apparatus and a method of implementing the apparatus are provided. The apparatus includes a control system, and a feedstock analysis system or output analysis system. A plasma forming device within a reactor of the waste conversion apparatus is controlled by the control system to apply a plasma arc to a supply of waste feedstock supplied to the system. Integrated feedback control is provided to the plasma forming device based on an analysis by the feedback analysis system to characterize of the supply of waste feedstock, and/or an analysis by the output analysis system to characterize a gas product from the reactor.

15 Claims, 17 Drawing Sheets

(56)          References Cited

U.S. PATENT DOCUMENTS

| | | | |
|---|---|---|---|
| 2018/0058381 A1* | 3/2018 | Chandran | ................ C10G 2/00 |
| 2018/0058382 A1 | 3/2018 | Chandran et al. | |
| 2020/0350542 A1* | 11/2020 | Wrobel | ............ H01M 10/0525 |
| 2021/0061665 A1* | 3/2021 | Tanaka | ................... B01J 19/088 |
| 2023/0416623 A1* | 12/2023 | Gaber | ...................... C10J 3/723 |

* cited by examiner 130,400

601

600

610   620   630   640

601

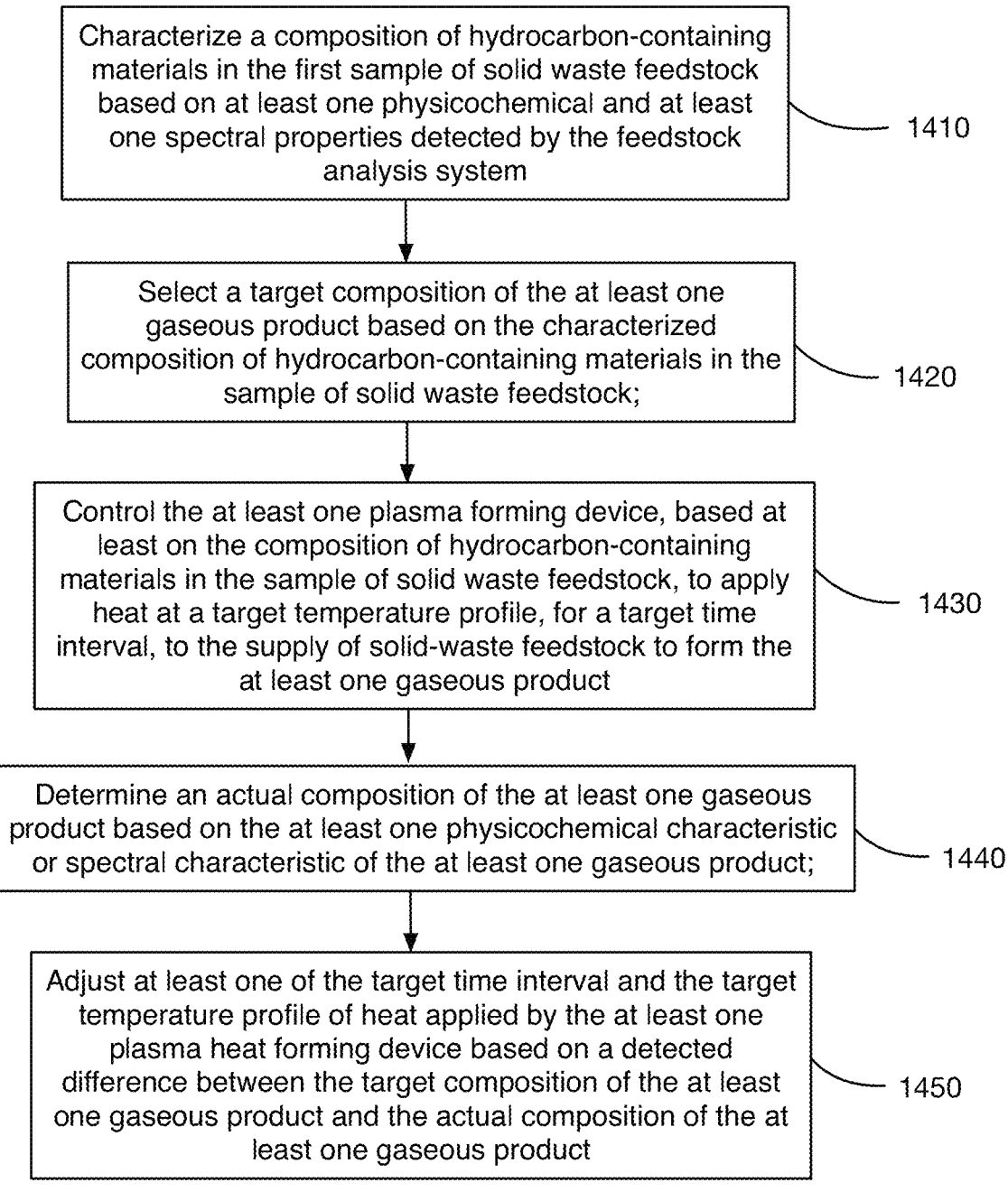

Characterize a composition of hydrocarbon-containing materials in the first sample of solid waste feedstock based on at least one physicochemical and at least one spectral properties detected by the feedstock analysis system — 1410

Select a target composition of the at least one gaseous product based on the characterized composition of hydrocarbon-containing materials in the sample of solid waste feedstock; — 1420

Control the at least one plasma forming device, based at least on the composition of hydrocarbon-containing materials in the sample of solid waste feedstock, to apply heat at a target temperature profile, for a target time interval, to the supply of solid-waste feedstock to form the at least one gaseous product — 1430

Determine an actual composition of the at least one gaseous product based on the at least one physicochemical characteristic or spectral characteristic of the at least one gaseous product; — 1440

Adjust at least one of the target time interval and the target temperature profile of heat applied by the at least one plasma heat forming device based on a detected difference between the target composition of the at least one gaseous product and the actual composition of the at least one gaseous product — 1450

FIG. 14

WASTE TO ENERGY SYSTEM AND PROCESS FOR SOLID WASTE FEEDSTOCK

CROSS-REFERENCE TO RELATED APPLICATIONS

This application is a divisional application of U.S. patent application Ser. No. 17/663,409 filed on May 13, 2022, the entire contents of which are incorporated by reference in this application, where permitted.

FIELD OF THE DISCLOSURE

The present disclosure relates generally to systems for extracting useful resources from solid waste material. In particular, the disclosure relates to a waste conversion apparatus and a method of implementing said apparatus.

BACKGROUND OF THE DISCLOSURE

The plasma processing of carbonaceous materials such as municipal solid waste (MSW) is known, and has been proposed as a means for eliminating large volumes of accumulated materials stored in urban and suburban landfills. The use of plasma torches provides advantages over incinerators or other combustion processes because the intense heat generated by the plasma torch (e.g., up to about ten thousand of degrees Fahrenheit) dissociates the waste material, causing the organic components of the waste to be turned to gas, and causing the inorganic components of the waste to be converted to a relatively small volume of inert vitrified material without combustion or incineration. The gaseous output is either filtered and collected or discharged, while the vitrified material is often used as an aggregate material amenable to a variety of construction uses.

Plasma processing has been suggested for use in processing bulk quantities of municipal solid waste (or similar types of waste), where the composition of the waste is significantly non-uniform. Current plasma-gasification processes and similar technologies are limited in these applications, as there are no large-scale installations that have been implemented where the varying compositions of the solid waste are analyzed and characterized "on the fly" while the plasma process is ongoing.

Furthermore, the use of mixed fixed/moving bed plasma reactors in pilot plants with continuous waste feed mode or batch mode is known in the art. However, the temperature control in these types of reactors is not complete, especially with increasing the size of the reactor. Also, the reactor must heat up before waste feeding, and this takes a long time and consumes more electric power, which reduces the efficiency of the conversion process.

Thus there is a need for a plasma gasification system that can be effectively employed for the large scale plasma processing of solid waste. The system should be flexible enough to enable the use of a variety of feed-stocks, including MSW, biomass, municipal solid waste material, hazardous waste material, coal of varying grades, pulp and paper waste material, wood products, sewage and sewage sludge material, food waste material, plant matter, rice straw material, and agricultural and animal waste material.

SUMMARY OF THE DISCLOSURE

According to an aspect, there is provided an apparatus for plasma-based conversion of solid waste feedstock into hydrocarbon gaseous products. The apparatus includes a reactor vessel, a continuous feed-in unit, and a control system. The reactor vessel defines a reactor chamber including an inlet, at least one plasma forming device for generating a plasma arc within the reactor chamber and an outlet conduit for expelling at least one gaseous product from the reactor chamber. The continuous feed-in unit is positioned for feeding a supply of solid waste feedstock to the inlet of the reactor chamber. The control system is connected to the at least one plasma forming device of the reactor vessel, and includes at least one processor programmed with computer executable instructions for controlling the at least one plasma forming device, based at least on the composition of hydrocarbon-containing materials in the sample of solid waste feedstock, to apply heat at a target temperature profile, for a target time interval, to the supply of solid-waste feedstock to form the at least one gaseous product.

According to another aspect, there is provided an apparatus for plasma-based conversion of solid waste feedstock into hydrocarbon gaseous products using closed-loop control. The apparatus includes a reactor vessel, a continuous feed-in unit, a feedstock analysis system, and a control system. The reactor vessel defines a reactor chamber including an inlet, at least one plasma forming device for generating a plasma arc within the reactor chamber and an outlet conduit for expelling at least one gaseous product from the reactor chamber. The continuous feed-in unit is positioned for feeding a supply of solid waste feedstock to the inlet of the reactor chamber. The feedstock analysis system is positioned to collect and analyze a sample from the supply of solid waste feedstock fed along the continuous feed-in unit. The feedstock analysis system includes at least one physicochemical sensor for detecting at least one physicochemical characteristic of the sample of solid waste feedstock, and at least one spectral sensor for detecting at least one spectral characteristic of the sample of solid waste feedstock. The control system is connected to the feedstock analysis system and to the at least one plasma forming device of the reactor vessel, and includes at least one processor programmed with computer executable instructions to:

characterize a composition of hydrocarbon-containing materials in the sample of solid waste feedstock based at least on the at least one physicochemical characteristic and at least one spectral characteristic detected by the feedstock analysis system; and control the at least one plasma forming device, based at least on the composition of hydrocarbon-containing materials in the sample of solid waste feedstock, to apply heat at a target temperature profile, for a target time interval, to the supply of solid-waste feedstock to form the at least one gaseous product.

According to another aspect, there is provided an apparatus for plasma-based conversion of solid waste feedstock into hydrocarbon gaseous products. The apparatus includes a reactor vessel, a continuous feed-in unit, a feedstock analysis system, and a control system. The reactor vessel defines a reactor chamber including an inlet, at least one plasma forming device for generating a plasma arc therewithin, and an outlet conduit for expelling at least one gaseous product therefrom. The continuous feed-in unit is positioned for feeding a supply of solid waste feedstock to the inlet of the reactor chamber. The supply of solid waste feedstock includes a first feedstock portion and a second feedstock portion. The feedstock analysis system is positioned to collect and analyze respective first and second samples from the first and second feedstock portions. The feedstock analysis system includes at least one physico-chemical sensor element for detecting at least one physicochemical characteristic of the first and second samples, and at least one spectral sensor element for detecting at least one spectral characteristic of the first and second samples. The control system is connected to the feedstock analysis system and the at least one plasma forming device, and includes at least one processor programmed with computer executable instructions to:

characterize a composition of hydrocarbon-containing materials in the first sample of solid waste feedstock based on the at least one physicochemical characteristic and at least one spectral characteristic of the first sample of solid waste feedstock;

control the at least one plasma forming device, based at least on the composition of hydrocarbon-containing materials in the first sample of solid waste feedstock, to apply heat at a target temperature profile, for a target time interval, to the supply of solid-waste feedstock to form a first one of the at least one gaseous product;

characterize a composition of hydrocarbon-containing materials in the second sample of solid waste feedstock based on the at least one physicochemical characteristic and at least one spectral characteristic of the second sample of solid waste feedstock; and adjust the at least one plasma forming device, based at least on the composition of hydrocarbon-containing materials in the second sample of solid waste feedstock, to apply heat at a second temperature profile, for a second time interval, to the supply of solid-waste feedstock to form a second one of the at least one gaseous product, at least one of the second temperature profile and second time interval being different, respectively, from the first temperature profile or the first time interval.

According to yet another aspect, there is provided an apparatus for plasma-based conversion of solid waste feedstock into hydrocarbon gaseous products. The apparatus includes a reactor vessel, a continuous feed-in unit, an output analysis system, and a control system. The reactor vessel defines a reactor chamber including an inlet, at least one plasma forming device for generating a plasma arc therewithin, and an outlet conduit for expelling at least one gaseous product from the reactor chamber, the at least one gaseous product having a target composition of hydrocarbon-containing materials. The continuous feed-in unit is positioned for feeding the supply of solid waste feedstock to the inlet of the reactor chamber. The output analysis system includes at least one gas composition sensor positioned to detect at least one physicochemical characteristic or at least one spectral characteristic of the at least one gaseous product from the reactor chamber. The control system is connected to the output analysis system and the at least one plasma forming device and includes at least one processor programmed with computer executable instructions to:

control the at least one plasma forming device to apply heat at a target temperature profile, for a target time interval, to the supply of solid-waste feedstock to form the at least one gaseous product having the target composition of hydrocarbon-containing materials;

determine an actual composition of the at least one gaseous product based on the at least one physico-chemical characteristic or at least one spectral characteristic of the at least one gaseous product; and adjust at least one of the target time interval and the target temperature profile of heat applied by the at least one plasma forming device based on a detected difference between the target composition of the at least one gaseous product and the actual composition of the at least one gaseous product.

According to yet another aspect, there is provided an apparatus for plasma-based conversion of solid waste feedstock into hydrocarbon gaseous products. The apparatus includes a reactor vessel, a continuous feed-in unit, a feedstock analysis system, an output analysis system, and a control system. The reactor vessel defines a reactor chamber including an inlet, at least one plasma forming device for generating a plasma arc therewithin, and an outlet conduit for expelling at least one gaseous product from the reactor chamber. The continuous feed-in unit is positioned for feeding the supply of solid waste feedstock to the inlet of the reactor chamber. The feedstock analysis system is positioned to collect and analyze a sample from the supply of solid waste feedstock fed along the continuous feed-in unit. The feedstock analysis system includes at least one phys-icochemical sensor element for detecting at least one phys-icochemical characteristic of the sample of solid waste feedstock and at least one spectral sensor element for detecting at least one spectral characteristic of the sample of solid waste feedstock. The output analysis system includes at least one gas composition sensor positioned to detect at least one physicochemical characteristic or at least one spectral characteristic of the at least one gaseous product from the reactor chamber. The control system is connected to the feedstock analysis system, the output analysis system and the at least one plasma forming device, and includes at least one processor programmed with computer executable instructions to:

characterize a composition of hydrocarbon-containing materials in the sample of solid waste feedstock based on the at least one physicochemical characteristic and at least one spectral characteristic detected by the feedstock analysis system;

select a target composition of the at least one gaseous product based on the characterized composition of hydrocarbon-containing materials in the sample of solid waste feedstock;

control the at least one plasma forming device, based at least on the composition of hydrocarbon-containing materials in the sample of solid waste feedstock, to apply heat at a target temperature profile, for a target time interval, to the supply of solid-waste feedstock to form the at least one gaseous product determine an actual composition of the at least one gaseous product based on the at least one physico-chemical characteristic or spectral characteristic of the at least one gaseous product; and adjust at least one of the target time interval and the target temperature profile of heat applied by the at least one plasma heat forming device based on a detected dif-ference between the target composition of the at least one gaseous product and the actual composition of the at least one gaseous product.

In some embodiments of this aspect, the target tempera-ture profile and target time interval are determined by the control system based at least on: the composition of hydro-carbon-containing materials in the sample of solid waste feedstock, and the target composition of the at least one gaseous product.

In some embodiments of this aspect, (which may include the above-noted embodiments), the apparatus further includes a pre-processing system connected for performing at least one pre-processing step on the supply of solid waste feedstock prior to the supply of solid waste feedstock being fed to the inlet of the reactor chamber. Optionally, the at least one pre-processing step performed by the pre-processing system includes a granulating process that forms a granulated supply of solid-waste feedstock, granules of the granulated supply of solid-waste feedstock have a size in a range from 1 mm to 10 mm.

In some embodiments of this aspect, (which may include the above-noted embodiments), the apparatus further includes a post-processing system. Optionally, the post-processing system includes least one condenser unit in fluid connection with the outlet conduit of the reactor chamber, the at least one gaseous product being passed through the at least one condenser unit to form a liquid product from a portion of the at least one gaseous product. As a further option, the post-processing system includes: a heat exchanger unit in fluid connection with the outlet conduit of the reactor chamber, the at least one gaseous product being passed through the heat exchanger for transferring an amount of excess heat from the at least one gaseous product to a working fluid of the heat exchanger unit such that the working fluid becomes at least partially vaporized; and a steam turbine for generating electricity, the turbine being in fluid connection with the heat exchanger unit such that the partially vaporized working fluid from the heat exchanger unit is fed to the turbine to drive the motion thereof.

BRIEF DESCRIPTION OF THE DRAWINGS

Embodiments will now be described, by way of example only, with reference to the attached Figures, wherein:

FIG. 14 shows a flow-chart diagram of a fourth set of computer executable instructions that are carried out on a processor of the control system;

DETAILED DESCRIPTION OF THE EMBODIMENTS

Figure 1:
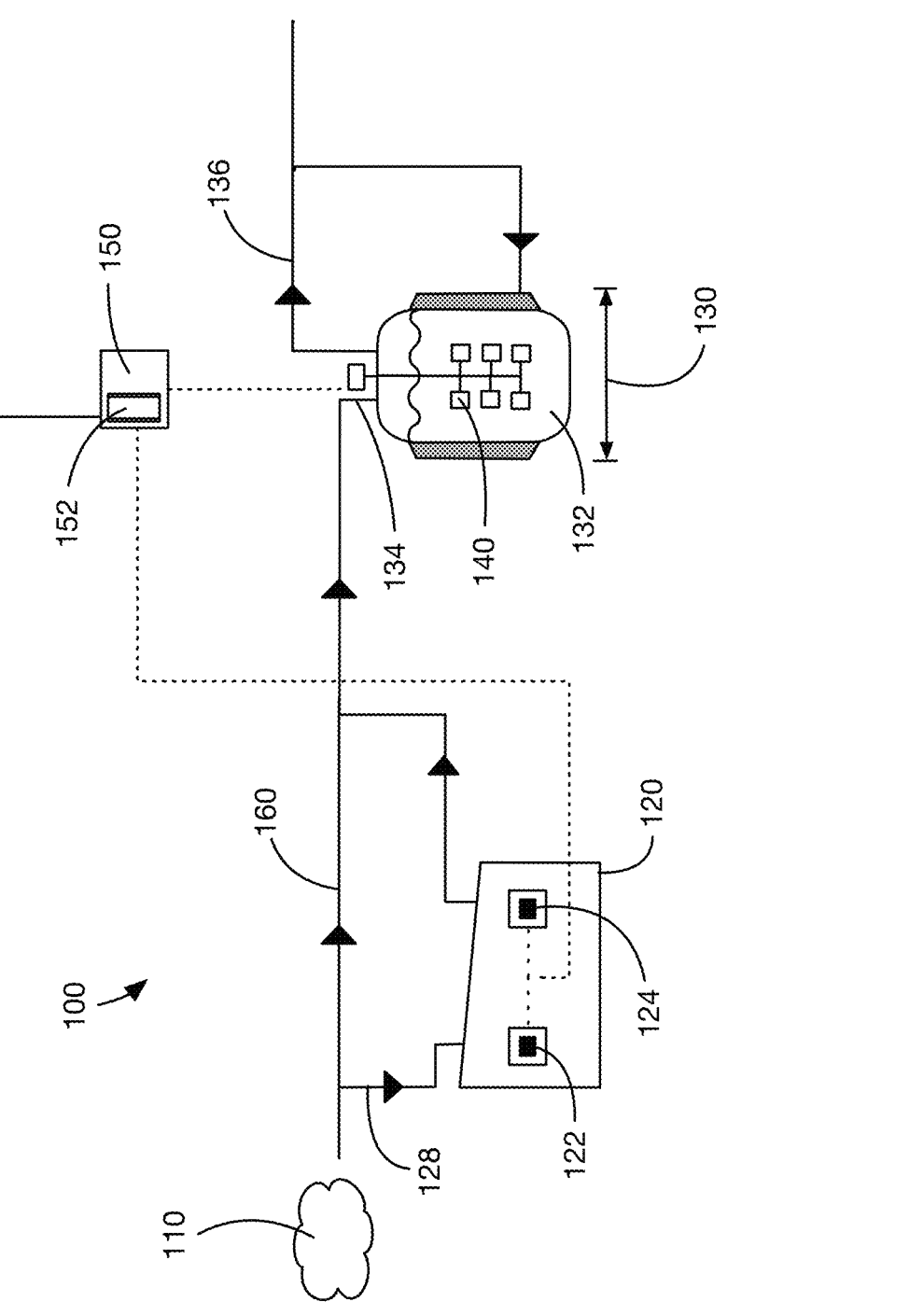
FIG. 1 shows a process control diagram of a waste conversion apparatus including a feedstock analysis system.

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The indefinite article "a" is not intended to be limited to mean "one" of an element. It is intended to mean "one or more" of an element, where applicable, (i.e. unless in the context it would be obvious that only one of the element would be suitable).

Any reference to upper, lower, top, bottom or the like are intended to refer to an orientation of a particular element during use of the claimed subject matter and not necessarily to its orientation during shipping or manufacture. The upper surface of an element, for example, can still be considered its upper surface even when the element is lying on its side.

The system and processes as disclosed herein includes an apparatus for plasma-based conversion of solid waste feedstock into hydrocarbon gaseous products shown at 100 (and which will, for convenience, be referred to as the waste conversion apparatus 100), as well as a number of processes that are implemented through the waste conversion apparatus to extract useful syngas or similar gaseous biproducts from various types of waste material. The waste material provided to the waste conversion apparatus is generally composed of various solid or semi-solid waste products. The solid waste material that is fed into the waste conversion apparatus is referred to herein as the supply of "waste feedstock" or "solid waste feedstock". The supply of waste feedstock can have a variety of forms and compositions, but generally the composition of the waste feedstock will include at least one carbon-containing material.

Referring to FIG. 1, an embodiment of the waste conversion apparatus 100 is shown, where the waste conversion apparatus 100 is for the conversion of a supply of waste feedstock 110 into at least one gaseous product. The at least one gaseous product including at least one hydrocarbon-containing gaseous product. In this embodiment, the waste conversion apparatus 100 comprises a reactor vessel 130 that defines a reactor chamber 132, where the reactor chamber 132 includes an inlet 134, at least one plasma forming device 140 for generating a plasma arc within the reactor chamber 132, and an outlet conduit 136 for expelling at least one gaseous product from the reactor chamber 132.

The waste conversion apparatus 100 also includes a continuous, feed-in unit 160 for feeding the supply of solid waste feedstock 110 to the inlet 134 of the reactor chamber 132, and a feedstock analysis system 120 that is positioned to collect and analyze a sample from the supply of solid waste feedstock 110 fed along the continuous feed-in unit 160. In the specific embodiment provided in FIG. 1, the continuous feed-in unit 160 is a feed-in line of piping. The feedstock analysis system 120 includes at least one physicochemical sensor 122 for detecting at least one physicochemical characteristic of the sample of solid waste feedstock, and at least one spectral sensor 124 for detecting at least one spectral characteristic of the sample of solid waste feedstock.

Additionally, the waste conversion apparatus 100 includes a control system 150 which is connected to the feedstock analysis system 120 and to the at least one plasma forming device 140 of the reactor vessel 130, and includes at least one processor 152. The at least one processor 152 of the control system 150 is programmed with computer executable instructions as presented in FIG. 11, including instructions to characterize a composition of hydrocarbon-containing materials in the sample of solid waste feedstock based at least on the at least one physicochemical characteristic and at least one spectral characteristic detected by the sensors 122, 124 of the feedstock analysis system 120, and to control the at least one plasma forming device 140, based at least on the composition of hydrocarbon-containing materials in the sample of solid waste feedstock, to apply heat at a target temperature profile, for a target time interval, to the supply of waste feedstock 110 to form the at least one gaseous product.

By integrating the feedstock analysis system 120 into the waste conversion apparatus 100, the supply of waste feedstock 110 provided to the waste conversion apparatus 100 is characterized as the feedstock is continuously fed to the reactor vessel 130 within the waste conversion apparatus 100. In this way, at least one aspect of the at least one plasma forming device 140 can be adjusted based on the physicochemical or spectral characteristics of the sample of waste feedstock detected by the feedstock analysis system 120.

Figure 2:
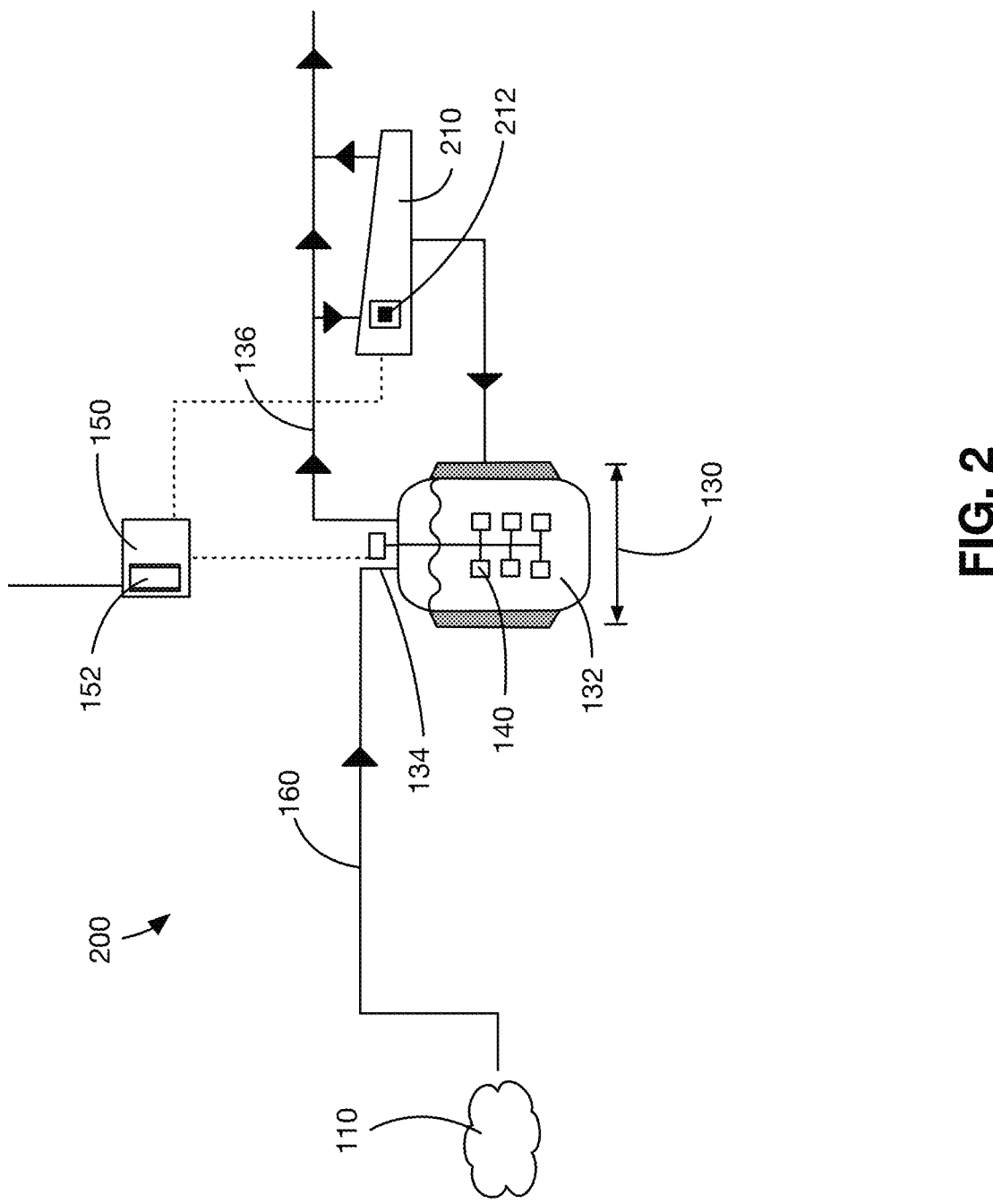
FIG. 2 shows a process control diagram of a waste conversion apparatus including an output analysis system.

In an additional embodiment of the waste conversion apparatus 100 disclosed herein, the system includes an output analysis system 210 in place of the feedstock analysis system 120. Referring to FIG. 2, a second embodiment of the waste conversion apparatus 200 is shown, where the waste conversion apparatus 200 is for plasma-based conversion of solid waste feedstock into at least one gaseous product, the at least one gaseous product including at least one hydrocarbon-containing gaseous product. In this embodiment, the waste conversion apparatus 200 comprises the reactor vessel 130 that defines the reactor chamber 132, where the reactor chamber 132 includes the inlet 134, at least one plasma forming device 140 for generating a plasma arc within the reactor chamber 132, and the outlet conduit 136 for expelling at least one gaseous product from the reactor chamber 132. The waste conversion apparatus also includes the continuous, feed-in unit 160 for feeding the supply of solid waste feedstock 110 to the inlet 134 of the reactor chamber 132, and an output analysis system 210 including at least one gas composition sensor 212 for detecting at least one physicochemical characteristic or spectral characteristic of the at least one gaseous product from the reactor chamber 132.

Lastly, the apparatus includes the control system 150 which is connected to the output analysis system 210 and to the at least one plasma forming device 140 of the reactor vessel 130, and includes at least one processor 152. The at least one processor 152 of the control system 150 is programmed with computer executable instructions as presented in FIG. 13, including instructions to control the at least one plasma forming device 140 to apply heat at a target temperature profile, for a target time interval, to the supply of waste feedstock 110 to form the at least one gaseous product having a target composition of hydrocarbon-containing materials, and determine an actual composition of the at least one gaseous product based on the at least one physicochemical characteristic or spectral characteristic of the at least one gaseous product. The at least one processor 152 of the control system 150 is further programmed with computer executable instructions to adjust at least one of the target time interval and the target temperature profile of heat applied by the at least one plasma heat forming device 140 based on a detected difference between the target composition of the at least one gaseous product and the actual composition of the at least one gaseous product.

In a further embodiment of the waste conversion apparatus 100 as disclosed herein, the waste conversion apparatus 100 is structured to include the feedstock analysis system 120 and the output analysis system 210, both of which are communicatively connected to the at least one processor 152 of the control system 150 and provide a combined functionality of the embodiments presented in both FIGS. 1 and 2. Processes executed on this embodiment of the waste conversion apparatus are described in greater detail below with specific reference to FIG. 14.

In an embodiment, the supply of waste feedstock 110 that is provided to the waste conversion apparatus 100 has a composition that includes at least one of a municipal solid waste material, a hazardous waste material, coal of varying grades, pulp and paper waste material, wood products such as shredded bark, wood chips or sawdust, sewage and sewage sludge material, food waste material, plant matter, rice straw material, agricultural and animal waste material, and cellulosic type industrial waste (e.g., construction wastes).

In an embodiment, the supply of waste feedstock 110 provided to the inlet of the reactor chamber 132 is composed of both organic and inorganic, solid waste material.

In an embodiment, the at least one gaseous product includes at least one syngas product such as gaseous ammonia, gaseous hydrogen, or other gaseous hydrocarbons.

Figure 3:
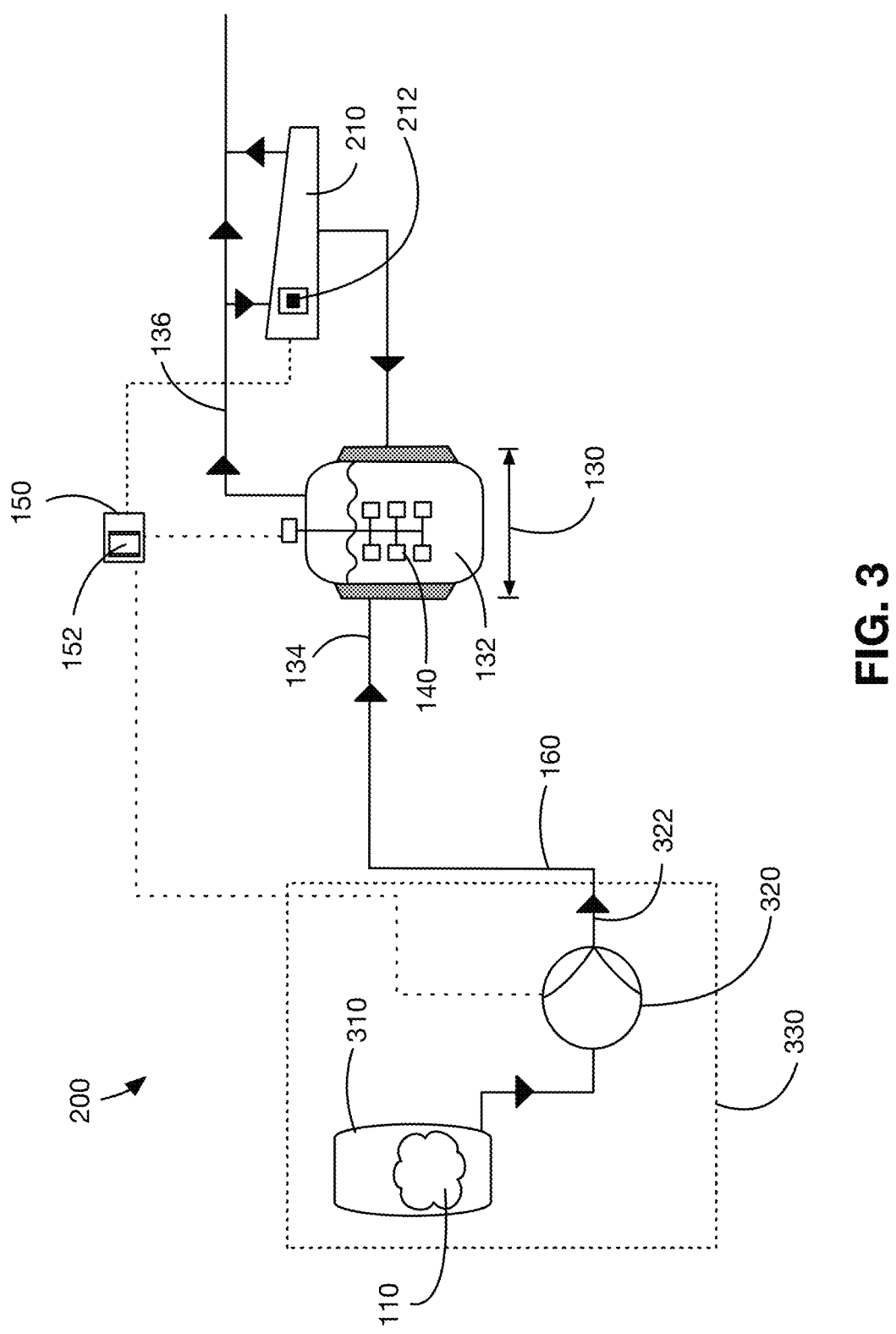
FIG. 3 shows a process control diagram of a waste conversion apparatus including a feedstock supply component and an output analysis system.

Referring to FIG. 3, the waste conversion apparatus 100 includes a continuous feed-in unit 160 for feeding the supply of solid waste feedstock 110 to the inlet 134 of the reactor chamber 132. In an embodiment such as the embodiment provided in FIG. 3, the continuous feed in unit 160 includes a feedstock supply conduit 322 that provides a continuous supply of the waste feedstock to the waste conversion apparatus 100. In an embodiment, the continuous feed-in unit 160 of the apparatus 100 includes a feedstock supply component 330 that provides a continuous or near-continuous supply of waste feedstock 110 to the waste conversion apparatus 100.

In the specific embodiment provided in FIG. 3, the feedstock supply component 330 includes a feedstock supply pump 320 for providing the supply of waste feedstock 110 to the reactor chamber 132 of the reactor vessel 130. The feedstock supply component 330 also includes the feedstock supply conduit 322 in the form of a pipe or a non-covered transport conduit such as a conveyor belt or conveyor mechanism. The feedstock supply conduit 322 transports the supply of waste feedstock 110 to the inlet of the reactor vessel 130.

In an embodiment, the waste feedstock that is to be continuously supplied to the waste conversion apparatus 100 is contained in the feedstock supply component 330 prior to its introduction to the waste conversion apparatus 100. In a specific embodiment provided in FIG. 3, the feedstock supply component 310 also includes at least one feedstock supply reservoir 310 that holds a volume of the waste feedstock. The feedstock supply component includes the supply pump 320 and the at least one feedstock supply reservoir 310 connected to the inlet 134 of the reactor chamber 132 via the feedstock supply conduit 322.

In an embodiment, the inlet of the reactor vessel 130 is in parallel connection with both the feedstock analysis system 120 and the feedstock supply component 330. In this way, the sample volume of the supply of waste feedstock 110 that is extracted to the feedstock analysis system 120 will be added back to the supply of waste feedstock 110 provided to the reactor chamber 132 of the reactor vessel 130 via the inlet 134.

In an additional embodiment, the feedstock supply conduit 322 is in the form of a plurality of pipes, and the at least one feedstock supply reservoir 310 is a plurality of supply reservoirs. Each of the plurality of supply reservoirs includes at least a portion of the supply of waste feedstock 110 and the plurality of pipes provide the portions of the supply of waste feedstock 110 to the inlet 134 of the reactor vessel 130.

In an embodiment, the feedstock supply conduit 322 is a plurality of conduits coming from each of the plurality of supply reservoirs that merge to combine each the feedstock from each supply reservoir to produce a combined supply of waste feedstock.

Reactor Vessel

As disclosed previously, the waste conversion apparatus 100 includes at least one plasma forming device 140, the at least one plasma forming device 140 generating a plasma arc within the reactor chamber 132 that is applied to the supply of solid waste feedstock 110 within the reactor chamber 132.

Figure 4:
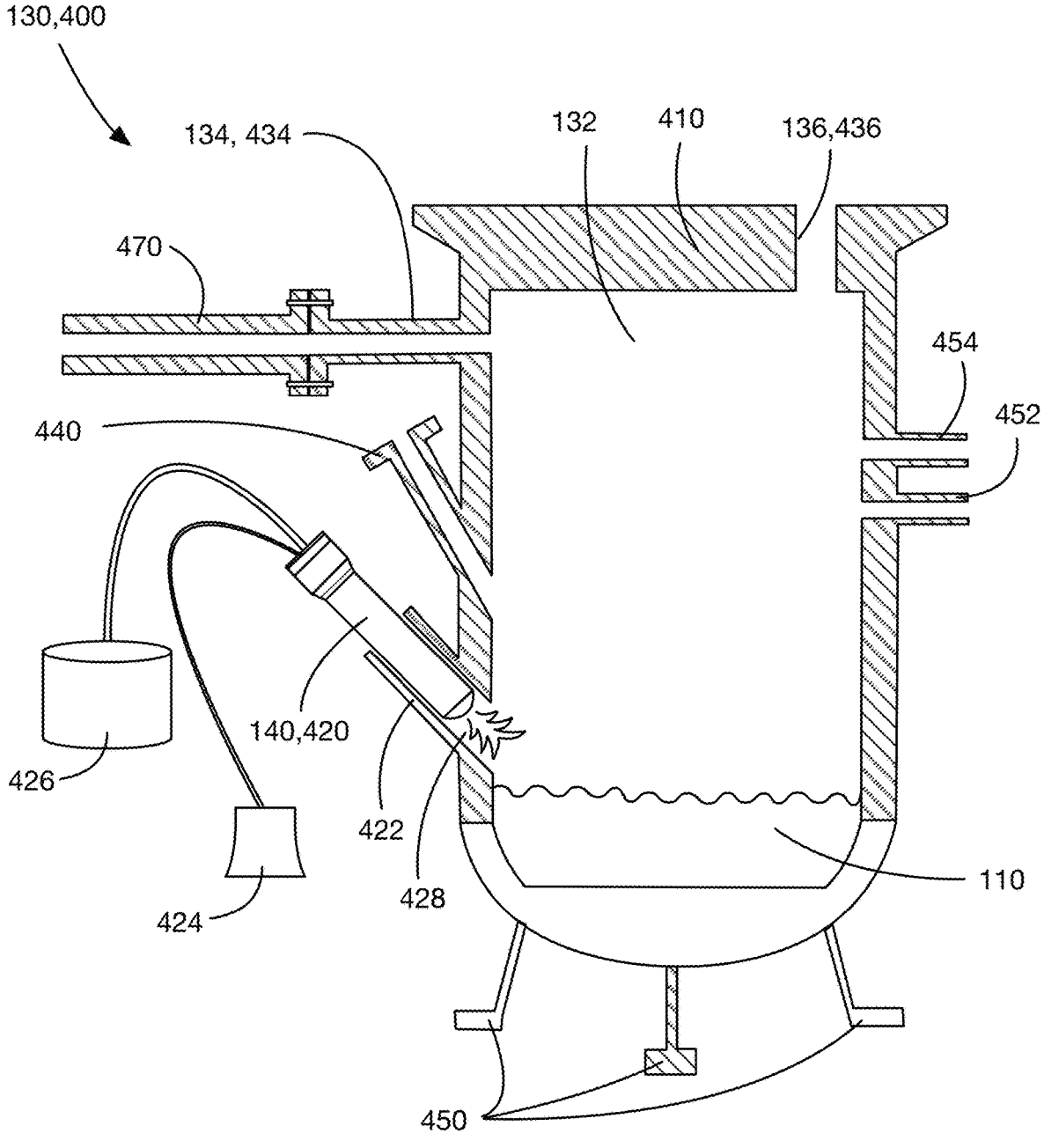
FIG. 4 shows a section, side-view of an embodiment of the reactor vessel and plasma torch in the waste conversion apparatus.

In the specific embodiment provided in FIG. 4, the at least one plasma forming device 140 is a plasma torch 420 such as a direct-current plasma torch. In this embodiment, the plasma torch 420 is connected to an external power supply unit 424 that provides a driving voltage to the direct-current plasma torch. The plasma torch 420 is also connected to an external gas supply unit 426 that provides a supply of at least one plasma-forming gas to the plasma torch 420. In this embodiment, a direct-current, plasma arc 428 formed by the plasma torch 420 will extends beyond a plasma forming tip of the direct-current plasma torch.

Figure 5:
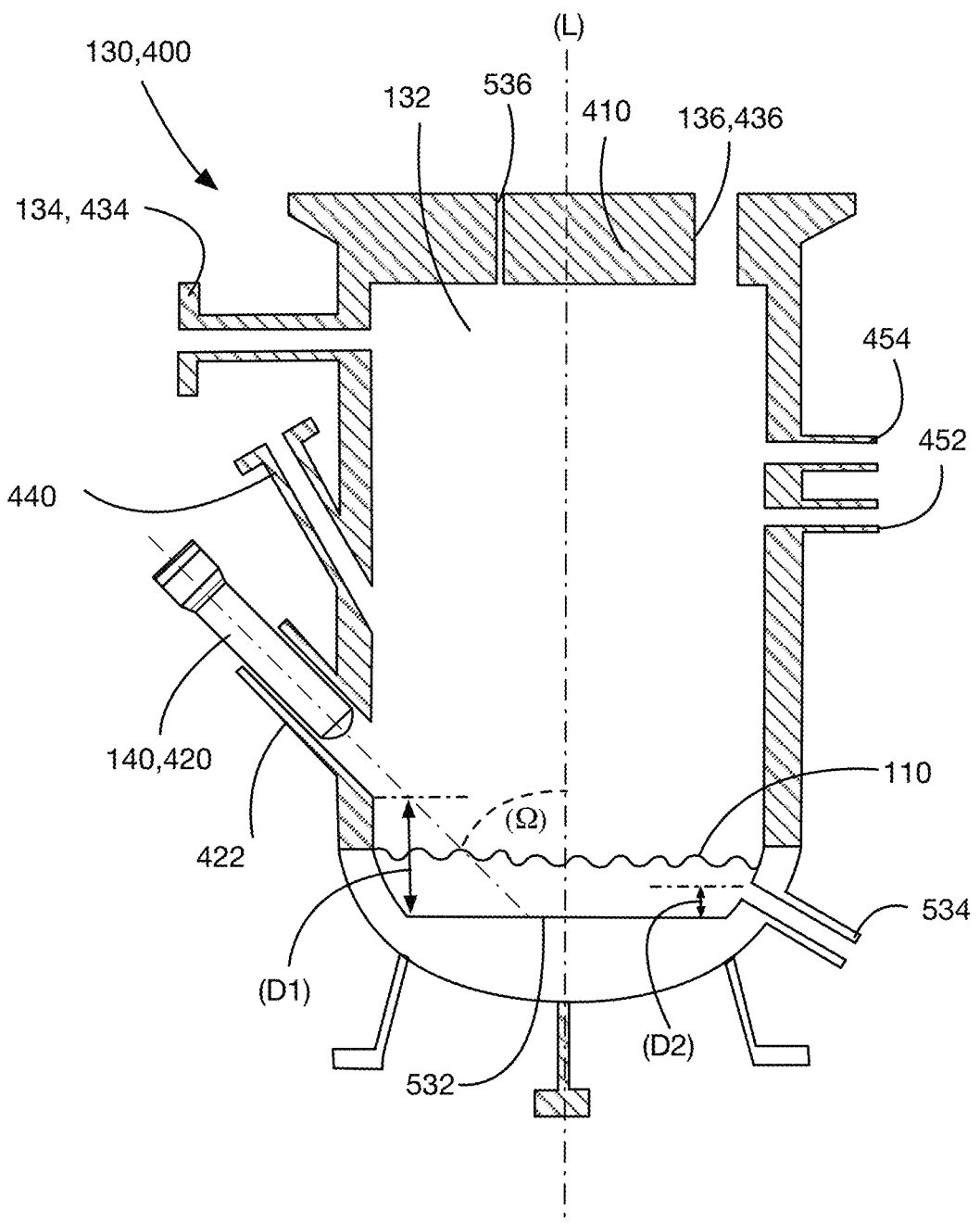
FIG. 5 shows a section, side-view of an alternate embodiment of the reactor vessel and plasma torch in the waste conversion apparatus.

Referring to FIGS. 4 and 5, an embodiment of the reactor vessel 130, 400 that defines a reactor chamber 132 is provided. As disclosed previously, the reactor vessel 130, 400 includes the inlet 134 for providing a supply of solid waste feedstock 110 thereto, the at least one plasma forming device 140 for generating a plasma arc within the reactor chamber 132, and the outlet conduit 136 for expelling at least one gaseous product. In the specific embodiment provided in FIG. 4, the feedstock supply conduit 322 is a supply pipe 470 in fluid connection with the inlet 134 of the reactor vessel 130. In this embodiment, the inlet 134 is an inlet pipe 434, where the supply pipe 470 is sized to correspond to the size of the inlet pipe 434. The outlet conduit 136 is an outlet aperture 436 in fluid connection with the reactor chamber 132.

In an embodiment, the wall 410 of the reactor vessel 130 includes at least one thermal insulation layer that is integrally formed as part of the wall 410, were the at least one thermal insulation layer allows for more accurate maintaining of the process temperature.

In an embodiment, the wall 410 of the reactor vessel 130 has a thickness of at least 4 mm.

In an embodiment, the reactor vessel 130 is composed of a metal material such as stainless steel.

Figures 6, 6A:
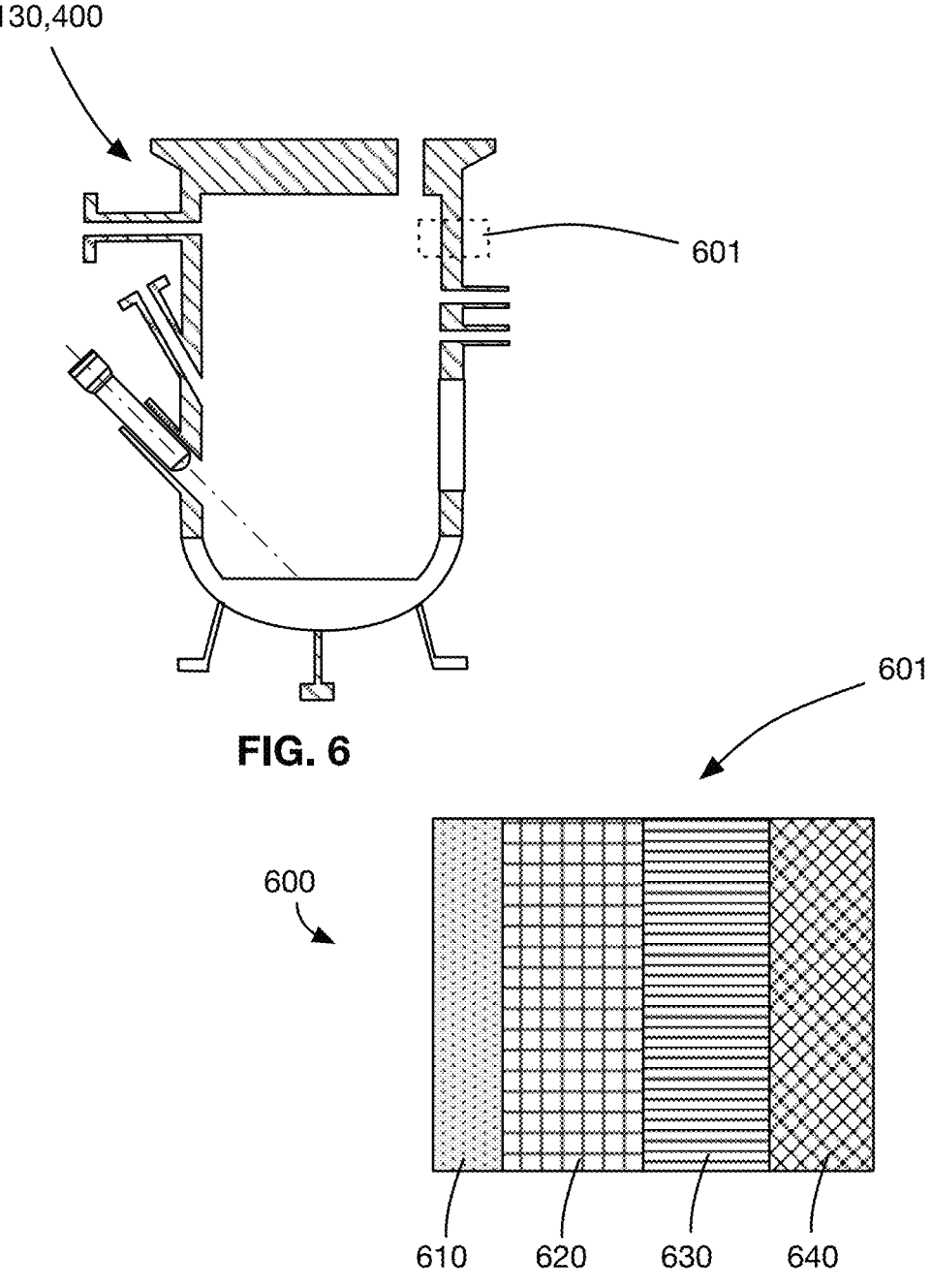
FIG. 6 shows a cut-away, side-view of an embodiment of the reactor vessel.
FIG. 6A shows a sectional view of a magnified portion of the reactor vessel of FIG. 6.

In the specific embodiment provided in FIG. 6, the wall 410 of the reactor vessel 130 is a multi-layer wall 600. A portion of the wall 600 is shown in a dotted rectangle at 601. The portion is magnified in FIG. 6A. In the example shown in FIG. 6A, the wall 600 includes an innermost layer 610 that may be a heat-resistant cement layer, a first intermediate layer 620 that may be a polycrystalline-mullite fiber layer, a second intermediate layer 630 that may be a fiber glass layer, and an outermost layer 640 that may be a stainless steel layer. The thicknesses of these layers 610, 620, 630 and 640, may be: about 3 cm for the innermost layer 610, about 10 cm for the first intermediate layer 620, about 2 cm for the second intermediate layer 630 and about 4 mm for the outermost layer 640. The outermost layer 640 may also be referred to as a support layer since in at least some embodiments, it supports the intermediate and inner layers 620, 630 and 610.

In other embodiments, the multi-layer wall 600 may include any suitable refractory material as the innermost layer 610, and any suitable outermost or support layer 640, such as a layer of stainless steel, and may or may not include any intermediate layers.

In the specific embodiment provided in FIGS. 4 and 5, the reactor vessel 130, 400 is approximately cylindrical in form and includes a correspondingly shaped reactor chamber 132. In this embodiment, the at least one plasma forming device 140 is the plasma torch 420, and the plasma torch 420 is mounted along a torch mounting channel 422 in the wall 410 of the reactor vessel 130, 400. In the embodiment of FIG. 5, the torch mounting channel 422 is formed within the wall 410 of the reactor vessel 130, 400 such that a plasma forming end of the plasma torch 420 is positioned at a predetermined distance (D1) from a bottom surface 532 of the reactor chamber 132. In an additional embodiment, the torch mounting channel 422 is formed in the wall 410 of the housing such that when the plasma torch 420 is mounted in the torch mounting channel 422, the plasma torch 420 is inclined at an angle ($\Omega$) relative to a long axis (L) of the reactor vessel 130. When the plasma torch 420 is mounted and inclined at an angle ($\Omega$), the plasma torch 420 will generate a centrifugal flow within the reactor chamber 132 due to the orientation of a jet of plasma gas from the plasma torch 420 within the reactor chamber 132. This centrifugal flow can rotate about an essentially horizontal axis of the reactor chamber 132, above the bottom surface 532 of the reactor chamber 132. In this embodiment, the flow of plasma gas within the reactor chamber 132 melts fly ash and unburned waste feedstock from the supply of solid waste feedstock 110 onto the wall 410 of the reactor chamber 132. By melting the fly ash and unburned waste feedstock, the emission of fly ash through the outlet conduit of the reactor vessel 130 will be reduced, thereby reducing the amount of contaminants within the at least one gaseous product.

In the specific embodiment of the reactor vessel 130 provided in FIG. 5, the torch mounting channel has an inner diameter of 15 cm, however, other diameters may be suitable, and the angle ($\Omega$) of the torch mounting channel relative to the long axis (L) of the reactor vessel 130 is in at an angle of about 45 degrees from a vertical axis, however other angles may be suitable. In this instance, 'about 45 degrees' may vary from 45 degrees by up to 5 degrees up or down, depending on the particular application, and may vary by more, depending on the application.

In an additional embodiment, the torch mounting channel 422 is formed in the wall 410 of the reactor vessel 130 such that when the plasma torch 420 is mounted in the torch mounting channel 422, the plasma forming end of the plasma torch 420 extends within a bottom half of the reactor chamber 132.

In an embodiment such as the embodiment provided in FIG. 5, the reactor vessel 130 further includes at least one gas inlet tube 536 in fluid communication with the reactor chamber 132 of the reactor vessel 130. The at least one gas inlet tube 536 extends through the wall 410 of the reactor vessel 130 and is provided as a means for adding gaseous process additives to the reactor chamber 132. The gaseous process additives can modify or improve an efficiency of processes performed within the reactor vessel 130 of the waste conversion apparatus 100. The at least one gas inlet tube 536 can include a control valve for allowing or preventing flow along the gas inlet tube 536.

In an additional embodiment, the at least one gas inlet tube 536 is formed in the wall 410 of the reactor vessel 130, as part of the reactor vessel 130 such that the at least one gas inlet tube 536 is inclined at an angle relative to the long axis (L) of the reactor vessel 130.

In an additional embodiment, the reactor vessel 130, inlet 134, and outlet conduit 136 are each composed of a metal material such as stainless steel, however, any other suitable material may be used.

In the embodiments where the slag drain pipe 534 is spaced above the bottom surface 532 of the reactor chamber 132, the reactor chamber 132 is formed to hold a volume of molten metal and glass therewithin, the volume of molten metal and glass acting as a thermal mass in order to reduce an amount of thermal energy that needs to be added by the at least one plasma forming device 140 to break down the supply of waste feedstock 110.

In an embodiment, the reactor chamber 132 includes at least one infrared heating element disposed therein. The at least one infrared heating element is for further controlling a temperature within the reactor chamber 132 to reduce the time and electrical power required to preheat the reactor chamber 132 of the reactor vessel 130 prior to the use of the at least one plasma forming device 140.

In an embodiment, the reactor vessel 130 includes an evacuation conduit that fluidly connects the reactor chamber 132 to an evacuation pump. The evacuation pump can evacuate gases out of the reactor chamber 132 prior to the gasification and pyrolysis process to achieve a predetermined reactor pressure. In an exemplary embodiment, the reactor pressure is approximately atmospheric pressure and the evacuation pump is a vacuum pump.

In the embodiment provided in FIGS. 4 and 5, the reactor vessel 130, 400 includes a plurality of reactor support legs 450 that form a reactor base. The reactor support legs 450 of the reactor vessel 130, 400 are fixed to a mounting surface. In an alternate embodiment, the reactor support legs 450 are formed such that the reactor vessel 130, 400 is movable.

In an additional embodiment as shown in 7, the reactor vessel 130 includes a slag drainage conduit 720 that is in fluid connection with the reactor chamber 132 of the reactor vessel 130. The slag drainage conduit 720 is positioned to drain out waste, inert slag that is formed during the pyrolysis and gasification of the supply of waste feedstock 110 within the reactor chamber 132.

In an additional embodiment, the slag drainage conduit 720 is in fluid connection with a waste storage unit that is sized to hold the waste, inert slag produced in the reactor chamber 132.

In the specific embodiment provided in FIG. 5, the slag drainage conduit 720 is a slag drain pipe 534 formed in a bottom half of the reactor vessel 130. The slag drain pipe 534 is formed in the bottom half of the reactor vessel 130 such that an inlet of the slag drain pipe 534 is positioned at a height (D2) above the bottom surface 532 of the reactor chamber.

In an additional embodiment, the height (D2) of the inlet of the slag drain pipe 534 is between 0.5 and 2 cm.

In an additional embodiment, the reactor vessel 130 includes an aperture 440 in the wall 410 thereof that extends to the reactor chamber 132. The aperture 440 functions as a window for monitoring the reaction process occurring within the reactor chamber 132. In an specific embodiment provided in FIGS. 4 and 5, the aperture 440 is a viewing window positioned on the wall 410 of the reactor vessel 130 such that a plasma-forming end of the at least one plasma forming device 140 is visible through the aperture 440. In an additional embodiment, the aperture 440 is filled with a transparent material such as heat-resistant glass.

In an embodiment, at least one of the reactor vessel 130 and the at least one plasma forming device 140 include an integrated cooling system for regulating a temperature of the reactor vessel 130 and the at least one plasma forming device 140. In a specific embodiment, the integrated cooling system is connected to an external coolant supply system that circulates a coolant fluid through the integrated cooling systems of the waste conversion apparatus 100.

Figure 7:
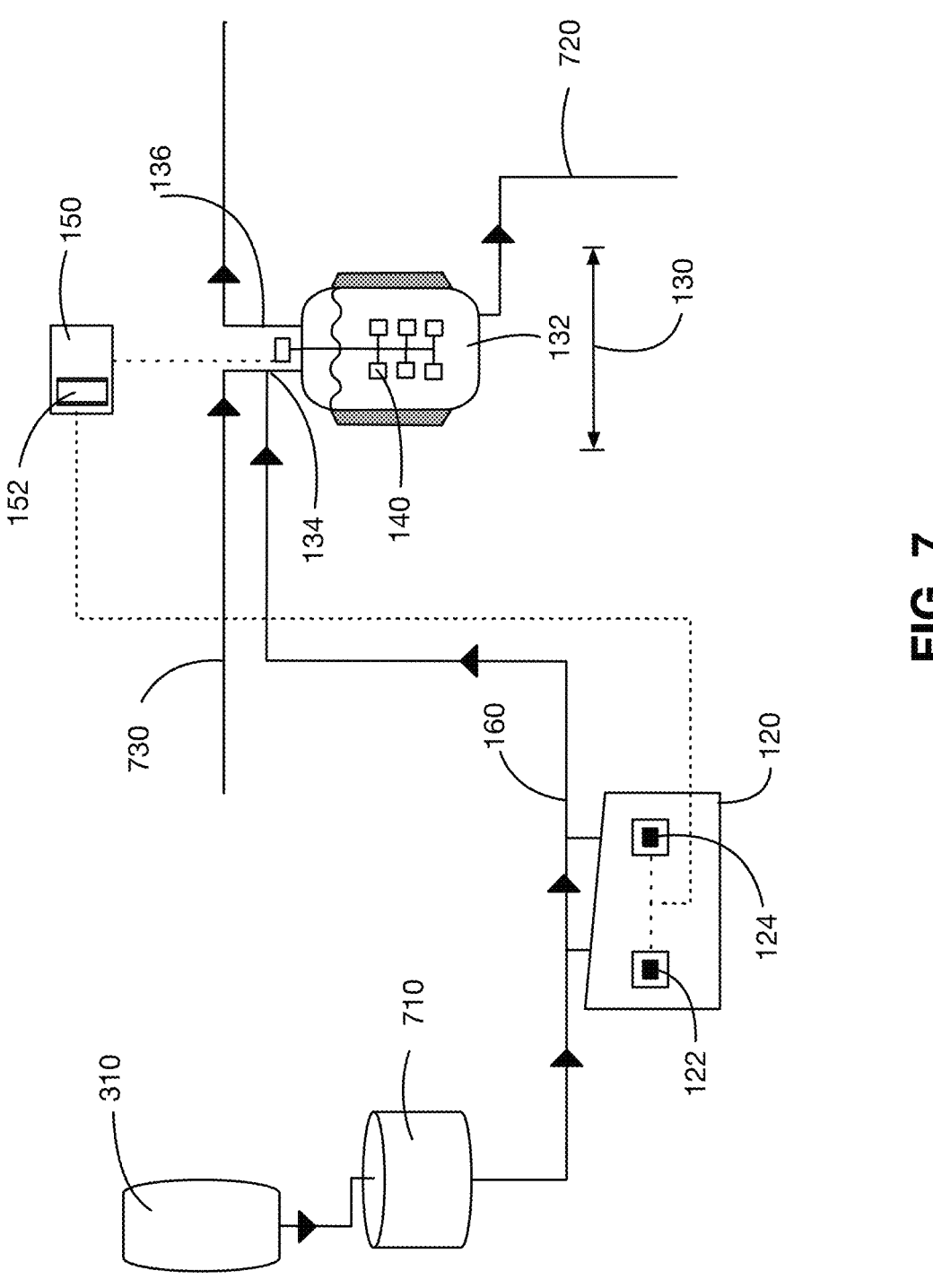
FIG. 7 shows a process control diagram of a waste conversion apparatus including a pre-processing unit and a feedstock analysis system.

Referring to FIG. 7, the waste conversion apparatus 100 as disclosed herein further comprises a pre-processing system positioned upstream of the continuous feed-in unit 160, where the pre-processing system includes at least one pre-processing unit 710 that is for drying and sorting the supply of waste feedstock 110. The drying and sorting of the supply of waste feedstock 110 is through any of a manual means, an automated means, or a combined manual and automated means within the at least one pre-processing unit 710 of the pre-processing system.

In a specific embodiment of the waste conversion apparatus 100 where the feedstock supply component 330 includes at least one feedstock supply reservoir 310, the feedstock supply reservoir 310 is configured as the at least one pre-processing unit 710.

In an alternate embodiment such as the embodiment provided in FIG. 7, the at least one feedstock supply reservoir 310 is separate from but connected to the at least one pre-processing unit 710.

In a specific embodiment, the pre-processing unit 710 includes a shredding component, where the supply of waste feedstock 110 is shredded by the shredding component such that there are no particles of waste product in the supply of waste feedstock 110 are above a pre-determined size. The shredding component can include one or multiple shredding steps carried out by one or more shredding mechanisms.

In a first exemplary embodiment, the supply of waste feedstock 110 is shredded such that the particles of the supply of waste feedstock 110 are no more than 10 mm in diameter. In an additional exemplary embodiment, the solid waste feedstock is pre-processed by the pre-processing system such that the supply of waste feedstock 110 is granulated to produce granules of the solid-waste feedstock having a size in a range from 1 mm to 10 mm.

In an additional embodiment, the pre-processing unit 710 includes a drying component where the supply of waste feedstock 110 is dried such that a moisture content of the supply of waste feedstock 110 is less than 7 wt. %.

Feedstock Analysis System

As disclosed previously, an embodiment of the waste conversion apparatus 100 includes a feedstock analysis system 120. The feedstock analysis system 120 is positioned to collect and analyze a sample from the supply of solid waste feedstock 110 that is fed along the continuous feed-in unit 160. The feedstock analysis system 120 includes at least one physicochemical sensor 122 for detecting at least one physicochemical characteristic of the sample of solid waste feedstock, and at least one spectral sensor 124 for detecting at least one spectral characteristic of the sample of solid waste feedstock.

In an embodiment, the feedstock analysis system 120 includes a feedstock sampling unit that is formed to extract a sample volume of the supply of solid waste feedstock 110 that is being fed along the continuous feed-in unit 160. In a specific embodiment such as the embodiment provided in FIG. 1, the feedstock sampling system includes a feedstock sampling conduit 128 that is in fluid connection with the continuous feed-in unit 160. The feedstock sampling conduit 128 is connected to the continuous feed-in unit 160 and is provided with a means for extracting the sample volume of the supply of solid waste feedstock 110. In an exemplary embodiment of the means for extracting the sample, the feedstock sampling system includes a pump in fluid connection with the feedstock sampling conduit 128, where the pump generates a pressure difference along the feedstock sampling conduit 128 to extract the sample volume of the supply of solid waste feedstock 110.

In an embodiment, the feedstock sampling conduit 128 is connected to a sampling reservoir within which the sample volume of the supply of solid waste feedstock 110 is analysed by the feedstock analysis system 120.

In an embodiment where the feedstock is provided as a continuous or near-continuous supply of waste feedstock 110, the feedstock analysis system 120 of the waste conversion apparatus 100 is used to continuously or near-continuously collect and analyze a sample of the supply of waste feedstock 110.

Figure 9:
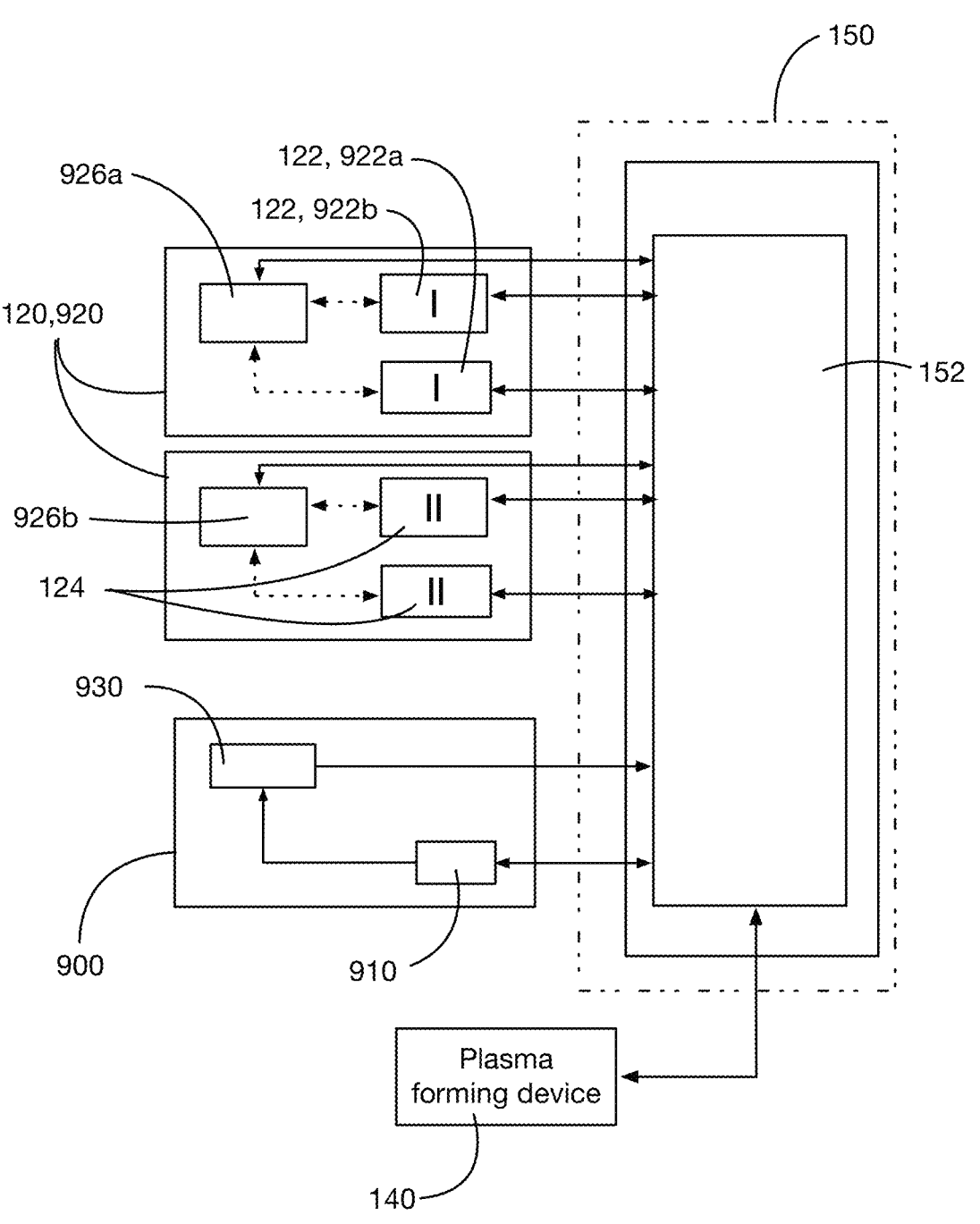
FIG. 9 shows a high-level schematic diagram of the control system of the waste conversion apparatus in FIG. 1.

Referring to FIG. 9, the feedstock analysis system 120 of the waste conversion apparatus 100 includes the at least one physicochemical sensor 122 and the at least one spectral sensor 124, where these sensors are directly connected to at least one processor 152 of the control system 150. The at least one physicochemical characteristic and the at least one spectral characteristic detected by the sensors 122, 124 of the feedstock analysis system 120 are communicated directly to the at least one processor 152 of the control system 150 of the waste conversion apparatus 100. In this embodiment, the feedstock analysis system 120 functions to acquire data related at least one physicochemical and at least one spectral characteristic of the supply of solid waste feedstock 110.

In the specific embodiment provided in FIG. 9, the at least one physicochemical sensor 122 of the feedstock analysis system 120 includes at least one physical sensor 922a that will detect the at least one physical characteristic and at least one chemical sensor 922b that will detect at least one chemical characteristic of the supply of solid waste feedstock 110.

In an embodiment, the at least one physicochemical sensor 122 is a plurality of sensors capable of detecting at least one physicochemical characteristic of the supply of waste feedstock 110. The at least one physicochemical sensor 122 may include any or more of a temperature probe, a thermocouple, a calorimeter, a thermogravimetric analyzer, and a differential scanning calorimetry (DSC) probe. In this embodiment, the at least one physicochemical characteristic is any one or more of a weight, a thermal stability, a heat duty, and a reactant potential energy of the supply of solid waste feedstock 110.

In an exemplary embodiment, the at least one spectral sensor 124 is any one or more of a mass spectrometer, an IR detector, a Fourier transform infrared (FTIR) spectrometer, a scanning electron microscope, a coupled x-ray emitter and detector, and a Raman spectrometer. The at least one spectral characteristic is any one or more of a spectral reflectance, spectral transmittance, and spectral absorptance of the supply of solid waste feedstock 110 for any of an ultraviolet, visible, and infrared frequencies.

In an alternate embodiment, the feedstock analysis system 120 is connected within the waste conversion apparatus 100 to perform one or more analysis steps on the data of the sample of waste feedstock acquired by the at least one physicochemical sensor 122 and the at least one spectral sensor 124 of the feedstock analysis system 120. Referring to FIG. 9, the feedstock analysis system 120 includes at least one feedstock analysis processor that is connected to the at least one physicochemical sensor and the at least one spectral sensor, and to the at least on processor of the control system 150. These one or more analysis steps are performed separate from of the at least one processor 152 of the control system 150. In the specific embodiment provided in FIG. 9, the at least one feedstock analysis processor is two feedstock analysis processors 926a, 926b, one connected to the at least one psychochemical sensor 122 and one connected to the at least one spectral sensor 124. The two feedstock analysis 926a, 926b processors analyze the at least one physical characteristic and at least one chemical characteristic of the sample of solid waste feedstock detected by the at least one physicochemical sensor 122 and the at least spectral characteristic detected by the spectral sensor 124 to characterize a composition of hydrocarbon containing material in the supply of solid waste feedstock 110.

Output Analysis System

As disclosed previously, an embodiment of the waste conversion apparatus 200 (shown in FIG. 2) includes an output analysis system 210 that includes at least one gas composition sensor 212, where the gas composition sensor 212 is positioned to detect at least one physicochemical characteristic or spectral characteristic of the at least one gaseous product from the reactor chamber 132. The output analysis system 210 is communicatively connected to the at least one processor 152 of the control system 150 in the waste conversion apparatus 100.

Figure 10:
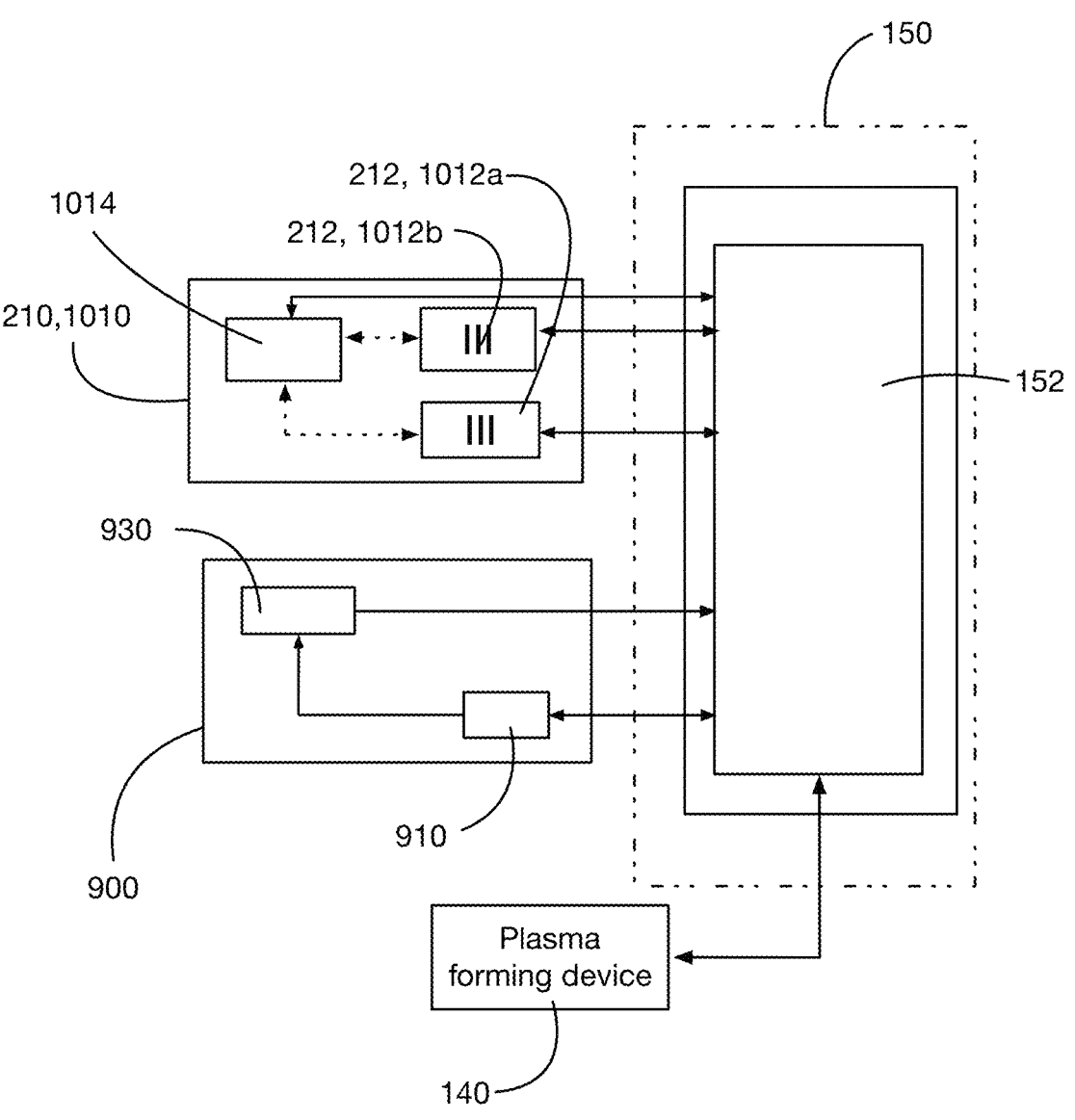
FIG. 10 shows a high-level schematic diagram of the control system of the waste conversion apparatus in FIG. 2.

In an embodiment shown in FIG. 10, the at least one gas composition sensor 212 of the output analysis system 210 is directly connected to at least one processor 152 of the control system 150. The at least one physicochemical characteristic or the at least one spectral characteristic of the at least one gaseous product detected by the output analysis 210 system are communicated directly to the at least one processor 152 of the control system 150 of the waste conversion apparatus 100.

In the specific embodiment provided in FIG. 10, the at least one gas composition sensor 212 of the output analysis system 210 includes a physicochemical sensor 1012a that will detect the at least one physicochemical characteristic and a spectral sensor 1012b that will detect at least one spectral characteristic of the at least one gaseous product.

In an embodiment, the at least one gas composition sensor 212 includes any of a temperature sensor, a pressure sensor, a thermocouple, a calorimeter, or a differential scanning calorimetry (DSC) probe. In this embodiment, the at least one physicochemical or spectral characteristic of the at least one gaseous product is any of a weight, a temperature, an pressure, a thermal stability, a heat duty, a spectral reflectance, spectral transmittance, and spectral absorptance of the at least one gaseous product.

In an embodiment, the output analysis system 210 also includes an output sampler that is formed to extract a sample volume of the at least one gaseous product that is expelled along the outlet conduit or the reactor chamber 132. In this embodiment, the output sampler includes a gas sampling conduit that is in fluid connection with outlet conduit 136 of the reactor chamber 132, where the output sampler extracts the sample volume of the at least one gaseous product to a gas sampling reservoir which contains the at least one gas composition sensor 212 positioned to detect at least one physicochemical characteristic or spectral characteristic of the at least one gaseous product.

In an alternate embodiment, the at least one gas composition sensor 212 detecting the at least one physicochemical characteristic or spectral characteristic of the at least one gaseous product is directly provided within the outlet conduit 136 of the reactor chamber 132.

In the specific embodiment provided in FIG. 10, the output analysis system 210 is connected within the waste conversion apparatus 100 to perform one or more analysis steps based on the at least one physicochemical characteristic and the at least one spectral characteristic detected by the at least one gas composition sensor. In this embodiment, the output analysis system 210 includes at least one output analysis processor 1014 that is connected to the at least one gas composition sensor 212 and the at least one processor 152 of the control system 150. The output analysis processor 1014 includes computer executable instructions that, when executed will cause the output analysis processor 1014 to analyze the at least one physicochemical characteristic and the at least one spectral characteristic detected by the at least one gas composition sensor 212 to determine a composition of the at least one gaseous product.

Control System

As disclosed above, the waste conversion apparatus 100 includes the control system 150 that, in its various embodiments (See FIGS. 7, 9 and 10), is connected to the at least one plasma forming device 140 and to one or both of the feedstock analysis system 120 and the output analysis system 210. In these various embodiments, the control system 150 controls the at least one plasma forming device 140 to achieve a temperature profile for the conversion of the supply of waste feedstock 110 into the at least one gaseous product. The control system 150 provides for the production of the at least one gaseous product having a specified composition.

As shown in FIGS. 7, 9 and 10, the control system 150 includes at least one processor 152 programmed with computer executable instructions for controlling the waste conversion apparatus 100 to execute several reaction processes.

The control system 150 of the waste conversion apparatus 100 is structured as various types of control system architecture suitable for the system 150 as disclosed herein. The control system 150 is structured as any one of a substantially centralized control system including a central, networked processor, a distributed control system including a series of distributed processors, or a combination centralized and distributed control system.

Figure 8:
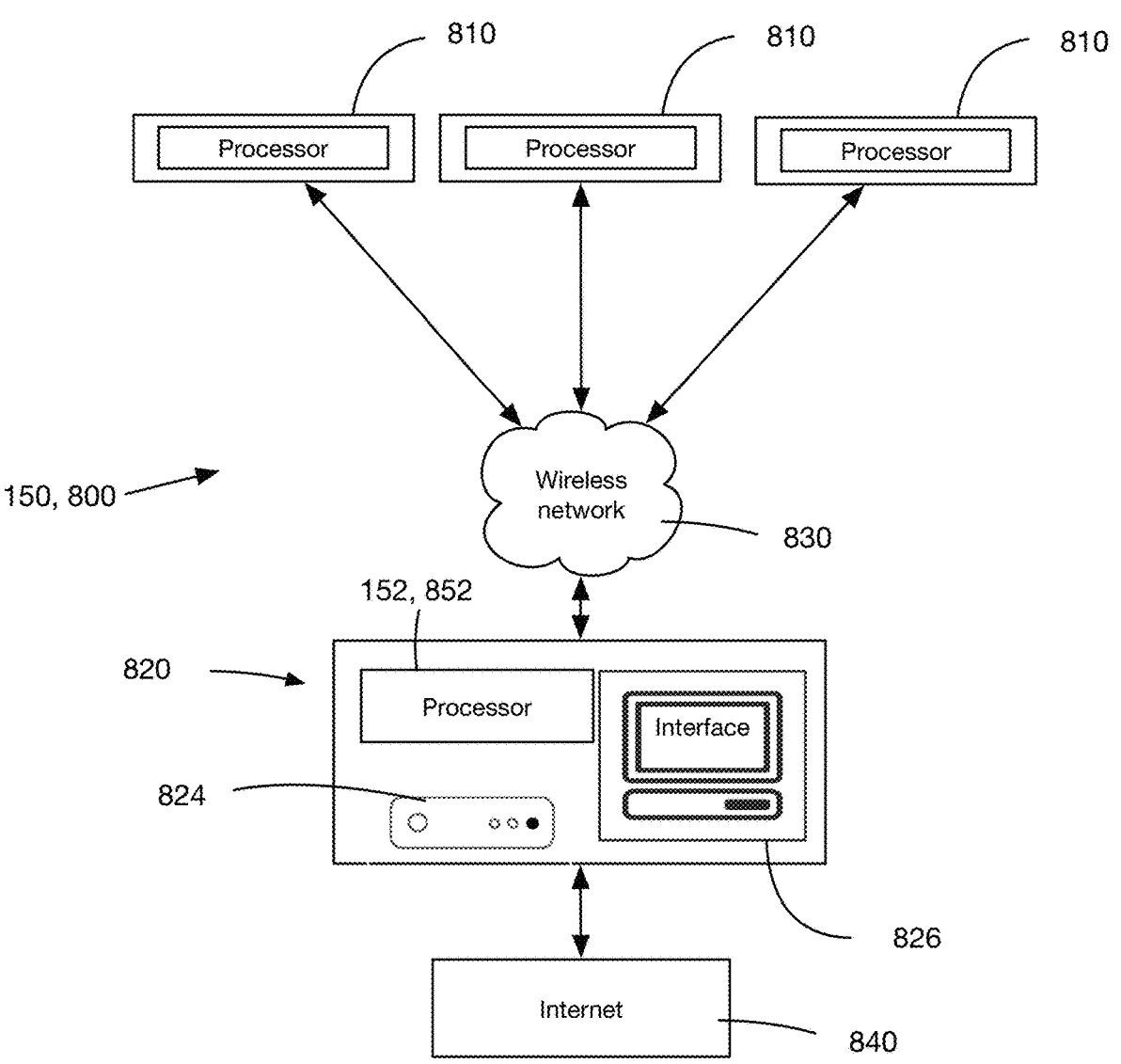
FIG. 8 shows a high-level schematic of the control system of the waste conversion apparatus including a plurality of distributed control subsystems.

In the specific embodiment provided in FIG. 8, the control system 150, 800 is subdivided into separate yet communicatively linked local control subsystems 810, each of the linked control subsystems 810 including at least one processor associated therewith. Such an architecture enables a given process or set of processes to take place and be controlled locally with minimal interaction with other subsystems 810. In this embodiment, the control system 150, 800 also includes a master control system 820 including at least one processor 152, 852 that communicates with each respective local control subsystem 810 for controlling an overall process within the waste conversion apparatus 100. The local control subsystems 810 are linked to the master control system 820 via a wired or wireless connection.

In the specific embodiment provided in FIG. 8, a wireless network 830 is provided to connect the control subsystems 810 to the master control system 820. The control system is also in communication with a large, public network, such as the Internet 840. FIG. 8 shows various physical elements of the master control system 820, including the processor 152, 852 processing unit, an input/output ("I/O") interface 826 and a storage component 824. The storage component 824 includes both random access memory ("RAM") and non-volatile storage. Non-volatile storage in the storage component 824 stores the operating system and programs, including at least some of the computer-executable instructions as described herein. The RAM of the storage component 824 provides relatively-responsive volatile storage to the at least one processor 152, 852 of the master control system 820. The I/O interface 826 allows for input to be received from one or more devices, such as a keyboard, a mouse, etc., and outputs information to output devices, such as a display and/or speakers.

In an embodiment as shown in FIGS. 9 and 10, the control system 150 is connected to the at least one plasma forming device 140, to at least one of the feedstock analysis system 120 and the output analysis system 210, and includes at least one other control subsystem 900 that is integrated within the waste conversion apparatus 100 as disclosed herein. In this embodiment of the waste conversion apparatus 100, the at least one other control subsystem 900 includes at least one sensor element 910 associated with at least one component of the waste conversion apparatus 100, for detecting at least one operating characteristic associated with the at least one of the component of the waste conversion apparatus 100. The at least one other control subsystem 900 also includes at least one control element 930 associated with at least one component of the waste conversion apparatus 100 for adjusting at least one operating parameter of at least one component of the waste conversion apparatus 100.

In an embodiment, the at least one control element 930 includes an actuator element that is controlled to be actuated by the at least one processor 152 of the control system 150.

In an embodiment, the at least one processor 152 of the control system 150 is programmed with computer executable instructions to compare the at least one operating characteristic detected by the at least one sensor element 910 of the at least one control subsystem 900 to suitable ranges of such characteristics, and to produce a response in the at least one control element 930 of the control subsystem 900.

The at least one sensor element 910 and the at least one control element 930 is associated with the same component of the waste conversion apparatus 100 or wholly different components of the waste conversion apparatus 100. The at least one sensor element 910 and the at least one control element 930 may thus be distributed throughout at least one component of the waste conversion apparatus 100 or in relation to at least one component thereof, to detect characteristics associated with processes occurring in the various components of the waste conversion apparatus 100.

In an embodiment, the at least one processor 152 of the control system 150 controls the at least one control element 930 based on the at least one operating characteristic monitored by the at least one sensor element 910.

In an additional embodiment, the control system 150 produces a response within at least one of the control elements 930 due to the at least one sensor elements 910 detecting an operating characteristic exceeding or falling below a threshold value, or falling outside of a predetermined range. In an alternate embodiment, the control system 150 produces a response within the at least one of the control element 930 of the control subsystem 900 due to a detected differential signal between several of the at least one sensor element 910.

In an embodiment, the control system 150 controls the at least one control element 930 based on the at least one physicochemical characteristic or the at least one spectral characteristic detected by the at least one physicochemical sensor 122 and the at least one spectral sensor 124 of the feedstock analysis system 120.

In an embodiment, the control system 150 controls the at least one control element 930 of the control subsystem 900 based on the at least one physicochemical characteristic or the at least one spectral characteristic detected by the at least one gas composition sensor 212 of the output analysis system 210.

As will be readily understood from the above disclosures, the at least one control element 930 and at least one sensor element of the control system 150 are implemented into various components of the waste conversion apparatus 100.

In the specific embodiments provided in FIGS. 9 and 10, the at least one physicochemical sensor 122 and the at least one spectral sensors 124 of the feedstock analysis system 120 are connected to the at least one processor 152 in addition to the at least one sensor element 910. Likewise, the at least one gas composition sensor 212 of the output analysis system 210 is connected to the at least one processor 152 in addition to the at least one sensor element 910.

In an alternate embodiment of the waste conversion apparatus 100, one or more of the at least one physicochemical sensor 122, the at least one spectral sensor 124 and the gas composition sensor 212 are connected to the at least one processor 152 of control system 150 and function as the sensor element 910 of the control subsystem 900.

In a specific embodiment that will understood based off the above description of the at least one plasma forming device 140 and the connection to the control system 150 thereof, an embodiment of the control system 150 is structured where the at least one control element 930 is a component of the at least one plasma forming device 140. In this way, the at least one control element 930 is controlled by the control system 152 to regulate the at least one plasma forming device 140, thereby controlling the temperature profile or the time interval of heat applied by the at least one plasma forming device 140.

In the specific embodiment where the at least one plasma forming device 140 is at least one plasma torch 420, the component of the plasma torch 420 that is the at least one control element 930 is any of the gas supply 426 of the at least one plasma torch or the external power supply 424 of the plasma torch.

In an additional embodiment, the at least one control element 930 of the control subsystem 900 is actuator that drives a rate of feed-in of the supply of waste feedstock 110 by the continuous feed-in system 160. In this way, a rate of the supply of waste feedstock 110 that is provided to the reactor chamber 132 of the reactor vessel 130 is varied by the control system 150.

In an embodiment, the at least one control element 930 of the control subsystem 900 is a flow regulating element provided at the gas inlet tube 536 of the reactor chamber 132. In this way, an amount, a type or a rate of process additives that are injected into the reactor chamber 132 is controlled by the control system 150.

In an embodiment, the at least one sensor element 910 of the control subsystem 900 is at least one flow measurement sensor. In an additional embodiment, some or all of the openings, conduits and inlets of the reactor vessel 130 (such as the reactor inlet 134, outlet conduit 136, gas inlet tube 536 or slag drainpipe 720) each include a sensor element 910 that is a flow measurement sensor. In this embodiment, the at least one control element 930 is a plurality of actuators associated with some or all of the openings, conduits and inlets that include an associated sensing element 910. The actuator is any suitable physical components for regulating fluid flow such as a flow regulating valve or a pressure release valves. In this embodiment, the control system 150 controls a response of some or all of the control elements 930 based on a detected characteristic from the at least one sensing element 910.

In an embodiment, the at least one control element 930 of the control subsystem 900 includes the at least one infrared heating element within the reactor chamber 132.

In an embodiment, the at least one sensor 910 of the control system 150 is at least one reactor sensor detecting a reading associated with a first characteristic within the reactor chamber 132 of the reactor vessel 130. The at least one reactor sensor is connected to the at least one processor 152 of the control system 150 and is generally disposed within the reactor vessel 130.

In an embodiment, the reactor vessel 130 is controlled by the control system 150 to prepare a high-temperature and oxygen-deprived environment within the reactor chamber 132 such that the hydrocarbon-containing constituents of the supply of solid waste feedstock 110 are transformed into the at least one syngas product with a conversion rate of at least 99%.

In an embodiment, the reactor vessel 130 and at least one plasma forming device 140 are designed such that an internal reactor chamber temperature of between 1300 to 1500 degrees Celsius is realized. In this embodiment, the temperature achieved within the reactor chamber 132 is great than the standard melting point of feedstock ash and tar, thereby providing a more complete destruction of any residual tar and ash that is produces during the plasma gasification and pyrolysis of the supply of solid waste feedstock 110.

In an embodiment such as the embodiment provided in FIG. 5, the at least one reactor sensor is at least partially exposed to the reactor chamber 132 of the reactor vessel 130. In this embodiment, the at least one reactor sensor is any of a temperature sensor, a flow sensor, a pressure sensor or other suitable or known sensor elements for monitoring a characteristic of a reaction process. In the specific embodiments provided in FIGS. 4 and 5, the at least on reactor sensor includes a pressure sensor 454 in the form of a pressure transduce for monitoring the pressure inside the reactor chamber 132, and a temperature sensor 452 in the form of a thermocouple tube for monitoring the temperature inside the reactor chamber 132 during the gasification and pyrolysis process of the supply of waste feedstock 110.

Figure 11:
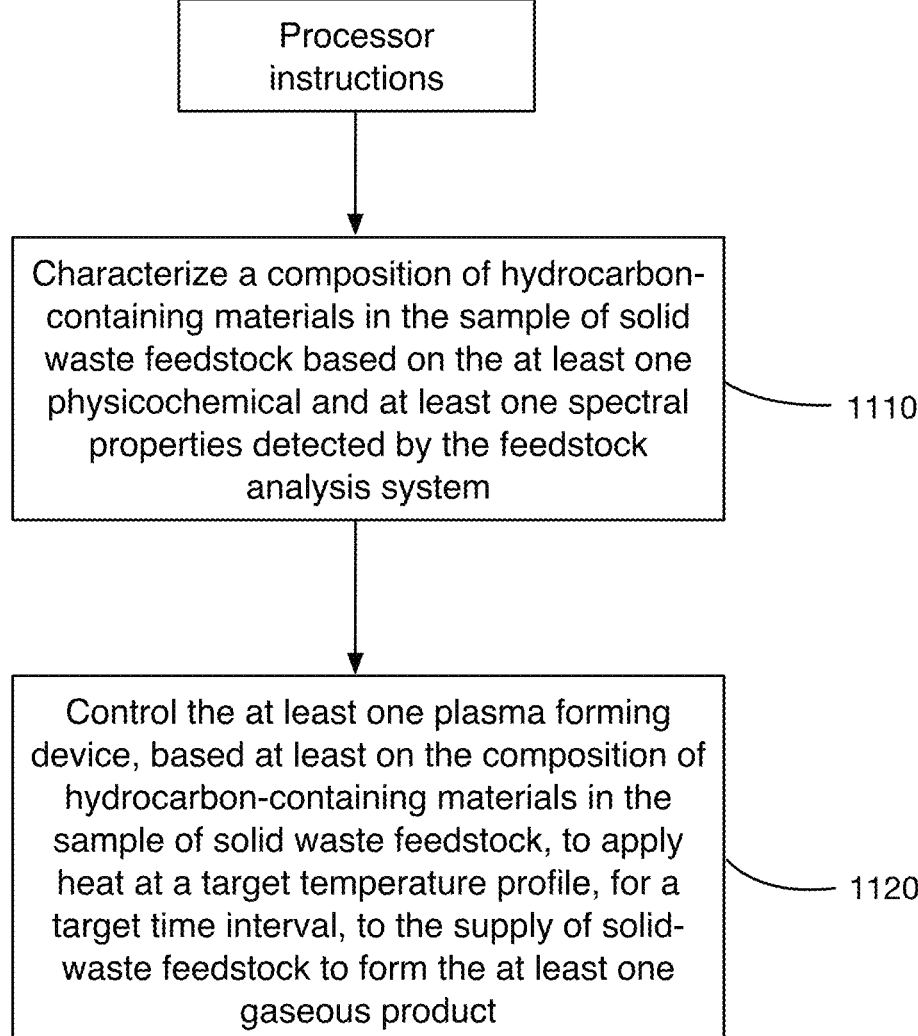
FIG. 11 shows a flow-chart diagram of a first set of computer executable instructions that are carried out on a processor of the control system.

In a first embodiment provided in FIG. 11, the control system 150 as described herein controls at least one process that is implemented by the various systems and subsystems of the waste conversion apparatus 100. Referring to FIG. 11, the at least one processor 152 of the control system 150 connected to the feedback analysis system is programmed with computer executable instructions including a first step (1110) of characterizing a composition of hydrocarbon-containing materials in the sample of solid waste feedstock based at least on the at least one physicochemical characteristic and at least one spectral characteristic detected by the feedstock analysis system 120, and a second step (1120) of controlling the at least one plasma forming device 140, based at least on the composition of hydrocarbon-containing materials in the sample of solid waste feedstock, to apply heat at a target temperature profile, for a target time interval, to the supply of waste feedstock 110 to form the at least one gaseous product.

Characterizing Composition of Feedstock

The first step (1110) of characterizing a composition of hydrocarbon-containing materials in at least one sample of solid waste feedstock is completed by the at least one processor 152 of the control system 150 based at least partially on the at least one physicochemical and spectral properties detected by the feedstock analysis system 120.

In an embodiment where the at least one physicochemical sensor 122 and the at least one spectral sensor 124 are connected to the at least one processor 152, feedstock data detected by the at least one spectral sensor 124 and at least one physicochemical sensor 122 is provided to the at least one processor 152 for analysis and for characterizing a composition of the sample of waste feedstock.

Figure 15:
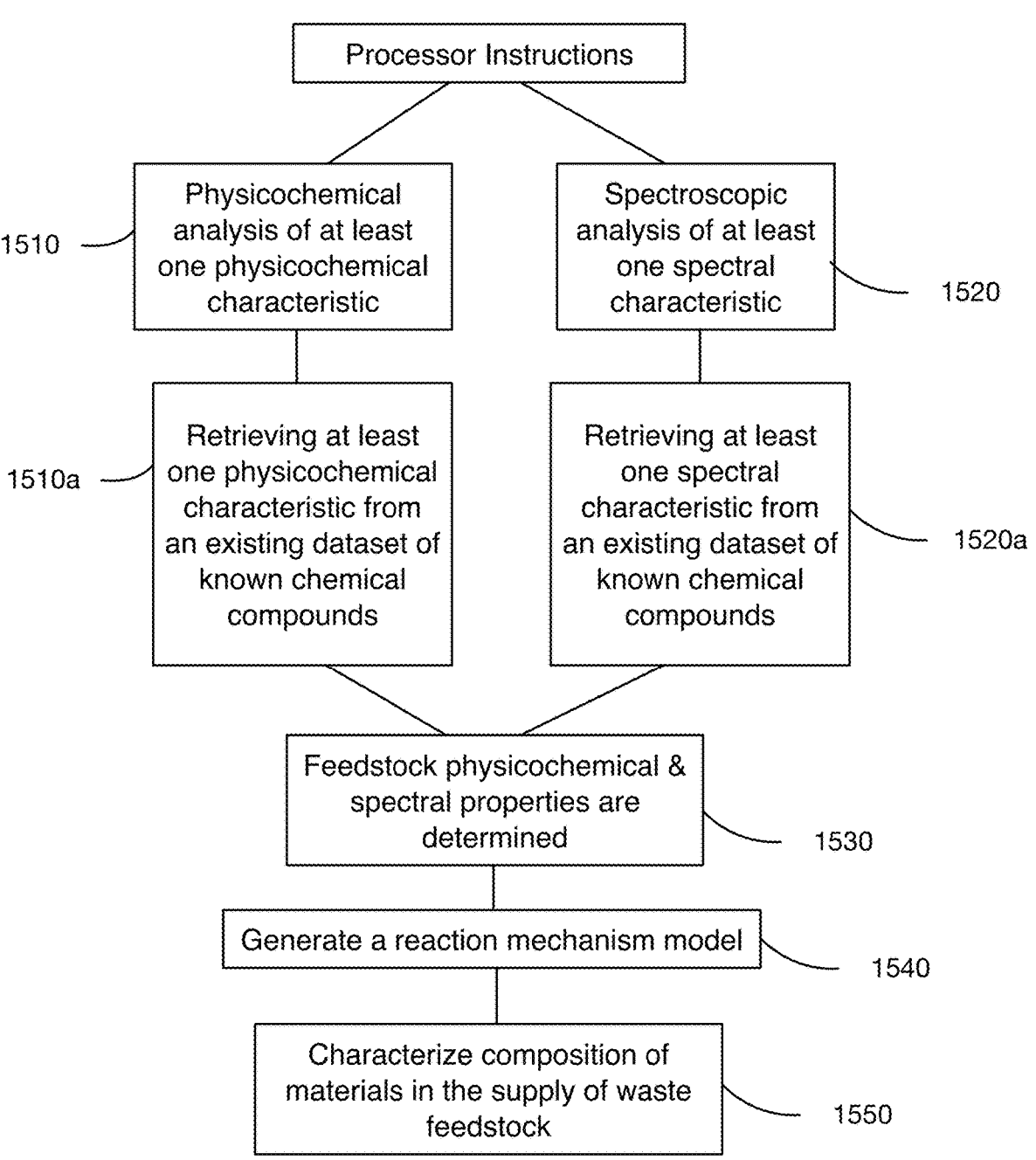
FIG. 15 shows a flow-chart diagram of a subset of computer executable instructions that are carried out on a processor of the control system.

Referring to FIG. 15, in analyzing the feedstock data to determine the composition of the sample of waste feedstock, the at least one processor 152 is programmed with computer executable instructions to perform at least one physicochemical analysis step (1510) and at least one spectral analysis step (1520) based on the respective on the at least one physicochemical characteristic and the at least one spectral characteristic of the feedstock. In performing the at least one physicochemical analysis step (1510) and the at least one spectral analysis step (1520), the at least one processor 152 can perform at least one computational step on a feedstock data associated with each analysis step.

In this embodiment, the physicochemical analysis step (1510) is various suitable physicochemical analysis procedures including a thermogravimetric analysis, an analysis to determine a fraction of volatile material, or a DSC analysis (heat flow analysis).

In this embodiment, the spectral analysis step (1520) is various suitable spectroscopic analysis procedures including an FTIR analysis, an SEM analysis, a coupled x-ray emitter and detector, or an ETC analysis In an embodiment, the at least one of the physicochemical analysis step (1510) and the spectral analysis step (1510) each include a step of retrieving at least one physicochemical characteristic or at least one spectral characteristic of a known compound from a existing dataset of known chemical compounds (1510a, 1520a). In an third step (1530), the at least one physicochemical characteristic and at least one spectral characteristic of the known compound are compared to the at least one physicochemical characteristic and at least one spectral characteristic of the supply of solid waste feedstock 110. In comparing the physicochemical and spectral characteristics, physical, chemical and spectral properties of the sample of waste feedstock are determined In a specific embodiment, the existing dataset of known chemical compounds is stored in a database system contained in a memory of the at least one processor 152. In an alternate embodiment, the database system is stored on an external computerized medium and the at least one processor 152 of the control system 150 includes suitable hardware or software connections to retrieve at least one physicochemical characteristic and at least one spectral characteristic of a known compound from this external database.

In a fourth step (1540), the at least one processor 152 of the control system 150 will generate a reaction mechanism model based on the physical, chemical and spectral properties of the sample of waste feedstock In a final step (1550) the composition of materials in the supply of solid waste feedstock 110 is characterized. In a first embodiment, the control system 150 characterizes the composition of materials in the supply of waste feedstock 110 based on the sample of physicochemical analysis step, the spectral analysis step, and at least one additional analysis step based on a result of the physicochemical analysis step and the spectral analysis step. In an alternate embodiment, the feedstock analysis system 120 and control system 150 characterizes the composition of materials in the supply of waste feedstock 110 based on the reaction mechanism model generated by the at least one processor 152 of the control system 150.

As disclosed in previous embodiments, the supply of solid waste feedstock 110 can be provided at a continuous or a near continuous rate to the waste conversion apparatus 100. In an embodiment of the waste conversion apparatus 100, a continuous or a near continuous supply of solid waste feedstock 110 includes a first feedstock portion and a second feedstock portion. In this embodiment, the composition of the supply of solid waste feedstock 110 can vary due to varying sources of waste material being provided as part of the feedstock. The feedstock analysis system 120 can collect and analyze respective first and second samples from the first and second feedstock portions to determine, via the at least one physicochemical sensor 122 and at least one spectral sensor 124, at least one physicochemical characteristic and at least one spectral characteristic of the first and second samples of the supply of solid waste feedstock 110.

Figure 12:
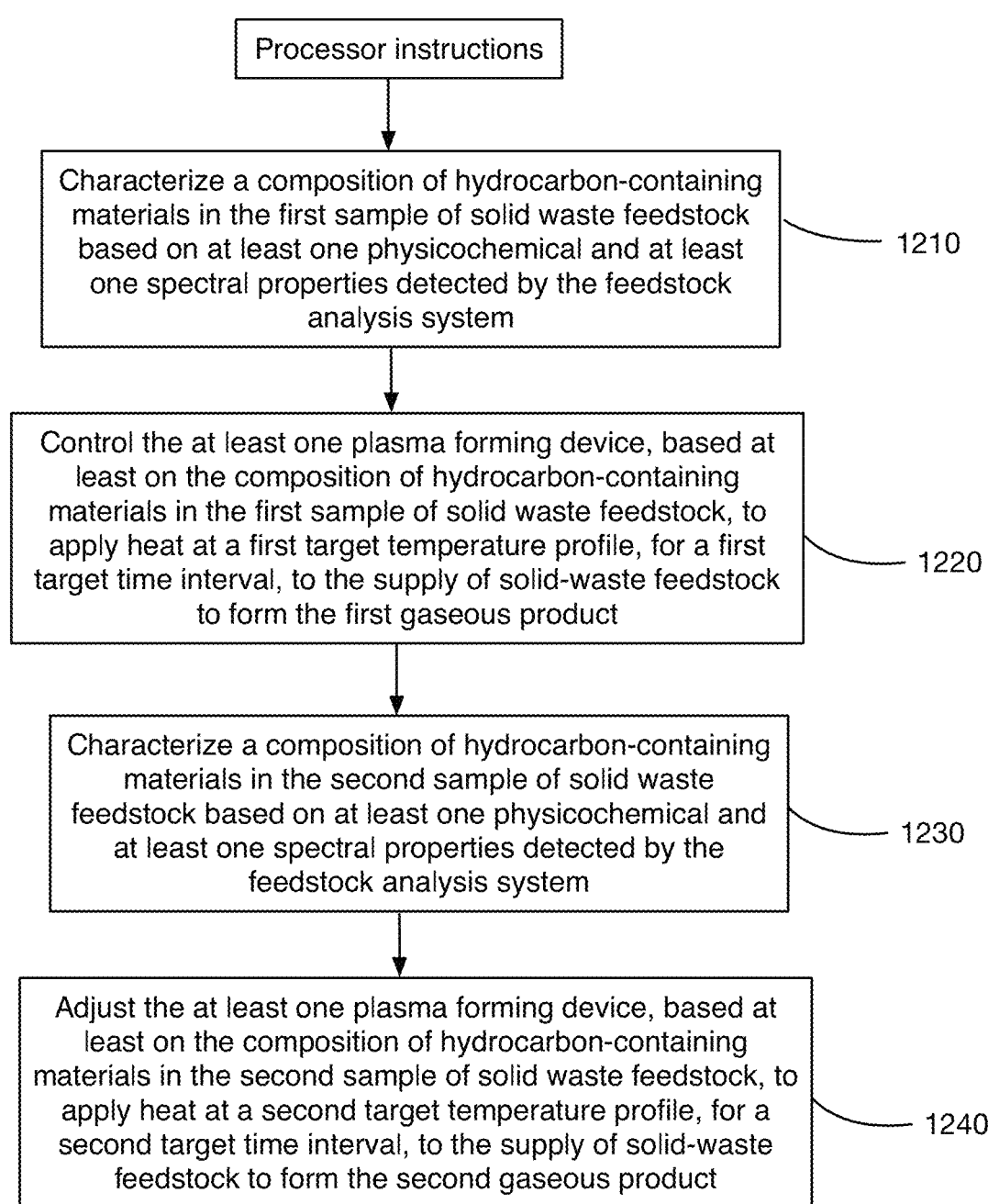
FIG. 12 shows a flow-chart diagram of a second set of computer executable instructions that are carried out on a processor of the control system.

In a specific embodiment provided in FIG. 12, the control system 150 controls an additional process that is implemented by the various systems and subsystems of the waste conversion apparatus 100 disclosed herein, and provides control of the systems or subsystems associated within these processes. Referring to FIG. 12, the at least one processor 152 of the control system 150 is programmed with computer executable instructions, as presented in FIG. 12. The instructions include a first step (1210) of characterizing a composition of hydrocarbon-containing materials in the first sample of solid waste feedstock based on the at least one physicochemical characteristic and at least one spectral characteristic of the first sample of solid waste feedstock, and a second step (1220) of controlling the at least one plasma forming device 140, based at least on the composition of hydrocarbon-containing materials in the first sample of solid waste feedstock, to apply heat at a target temperature profile, for a target time interval, to the supply of waste feedstock 110 to form the a first gaseous product. The at least one processor 152 of the control system 150 is also programmed with computer executable instructions to, in a third step (1230), characterize a composition of hydrocarbon-containing materials in the second sample of solid waste feedstock based on the at least one physicochemical characteristic and at least one spectral characteristic of the second sample of solid waste feedstock, and in a fourth step (1240), adjust the at least one plasma forming device 140, based at least on the composition of hydrocarbon-containing materials in the second sample of solid waste feedstock, to apply heat at a second temperature profile, for a second time interval, to the supply of waste feedstock 110 to form a second gaseous product. In this embodiment at least one of the second temperature profile and second time interval is different, respectively, from the first temperature profile or the first time interval.

In an embodiment, the difference in the at least one of the second temperature profile and first temperature profile, or the second time interval and the first time interval is determined based on a difference in the compositions of the at least one first gaseous product and the at least one second gaseous product.

In an embodiment, the difference in the at least one of the second temperature profile and first temperature profile, or the second time interval and the first time interval is determined based on a difference in the compositions of hydrocarbon-containing materials in the first portion of solid-waste feedstock and the compositions of hydrocarbon-containing materials in the second portion of solid waste feedstock.

In an embodiment of the waste conversion apparatus 100, the control system 150 is connected to the output analysis system that includes the at least gas composition sensor 212 that detects at least one physicochemical characteristic or at least one spectral characteristic of the at least one gaseous product that is expelled from the reactor chamber 132. In this way, the control system 150 as described herein controls at least one process that is implemented by the various systems and subsystems of the waste conversion apparatus 100 disclosed herein, and provides control of the systems associated within these processes.

Figure 13:
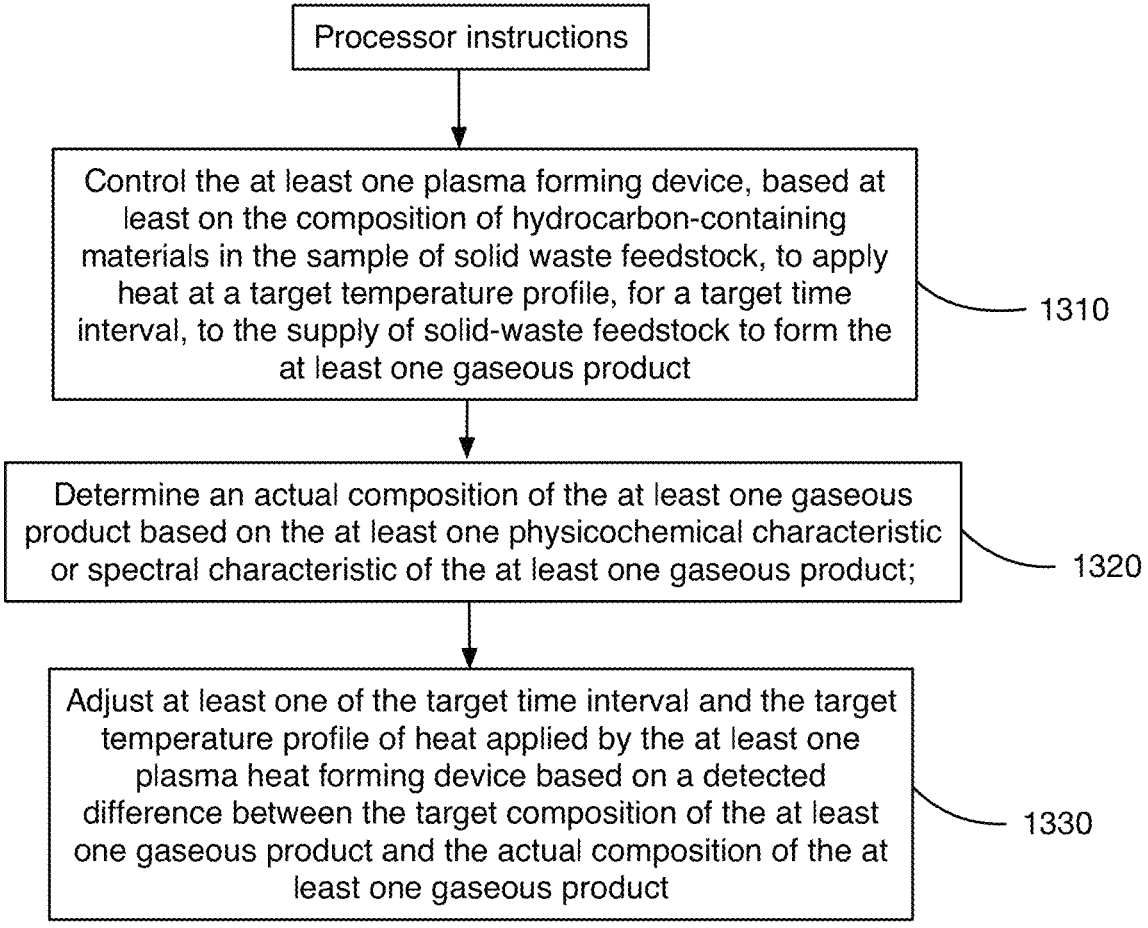
FIG. 13 shows a flow-chart diagram of a third set of computer executable instructions that are carried out on a processor of the control system.

Referring to FIG. 13, the at least one processor 152 of the control system 150 connected to the output analysis system is programmed with computer executable instructions to, in a first step (1310) control the at least one plasma forming device 140 to apply heat at a target temperature profile, for a target time interval, to the supply of waste feedstock 110 to form the at least one gaseous product having the target composition of hydrocarbon-containing materials, and in a second step (1320), determine an actual composition of the at least one gaseous product based on the at least one physicochemical characteristic or at least one spectral characteristic of the at least one gaseous product, and in a third step (1330) adjust at least one of the target time interval and the target temperature profile of heat applied by the at least one plasma heat forming device based on a detected difference between the target composition of the at least one gaseous product and the actual composition of the at least one gaseous product.

In an embodiment of the waste conversion apparatus 100, the control system 150 is connected to each of the output analysis system 210 and the feedstock analysis system 120. In this way, the control system 150 as described herein controls at least one process that is implemented by the various systems and subsystems of the waste conversion apparatus 100 disclosed herein, and provides control of the systems associated within these processes.

Referring to FIG. 14, the at least one processor 152 of the control system 150 connected to the feedstock analysis system 120 and the output analysis system 210 is programmed with computer executable instructions to, in a first step (1410) characterize a composition of hydrocarbon-containing materials in the sample of solid waste feedstock based on the at least one physicochemical characteristic and at least one spectral characteristic detected by the feedstock analysis system 120, in a second step (1420), select a target composition of the at least one gaseous product based on the characterized composition of hydrocarbon-containing materials in the sample of solid waste feedstock, and in a third step (1430), control the at least one plasma forming device 140, based at least on the composition of hydrocarbon-containing materials in the sample of solid waste feedstock, to apply heat at a target temperature profile, for a target time interval, to the supply of waste feedstock 110 to form the at least one gaseous product having the target composition. The at least one processor 152 is further programmed with instructions to, in a fourth step (1440) determine an actual composition of the at least one gaseous product based on the at least one physicochemical characteristic or spectral characteristic of the at least one gaseous product, and in a fifth step (1450), adjust at least one of the target time interval and the target temperature profile of heat applied by the at least one plasma heat forming device based on a detected difference between the target composition of the at least one gaseous product and the actual composition of the at least one gaseous product.

In an additional embodiment, the at least one processor 152 is programmed with instructions to select or prompt the selection of a target composition of the at least one gaseous product. In this embodiment, the step of selecting a target composition of at least one gaseous product that is produced from the supply of solid waste feedstock 110 can occur at several instances throughout the system.

In embodiment, the step of selecting of a target composition of the at least one gaseous product is completed after the step of characterizing a composition of hydrocarbon-containing materials in the sample of solid waste feedstock. In this way, the step of selecting the target composition of the at least one gaseous product is at least partially based on the physicochemical characteristic and at least one spectral characteristic detected by the feedstock analysis system 120 is used to select the target Similarly, the step of selecting of a target composition of the at least one gaseous product can be completed without performing the step of characterizing a composition of hydrocarbon-containing material in the sample of solid waste feedstock via the feedstock analysis system 120. In this way, the step of selecting the target composition of the at least one gaseous product is at least partially based on a predetermined composition of the supply of solid waste feedstock 110.

In an additional embodiment, the step of selecting the target composition of the at least one gaseous product is at least partially based on a current, market price of at least one composition of the at least one gaseous product. In this embodiment, the at least one processor 152 of the control system 150 is programmed with computer executable instructions to retrieve on a current, market price of at least one composition of the at least one gaseous product and to a prompt a selection of a target composition of the at least one gaseous product.

Post-Processing

Figure 16:
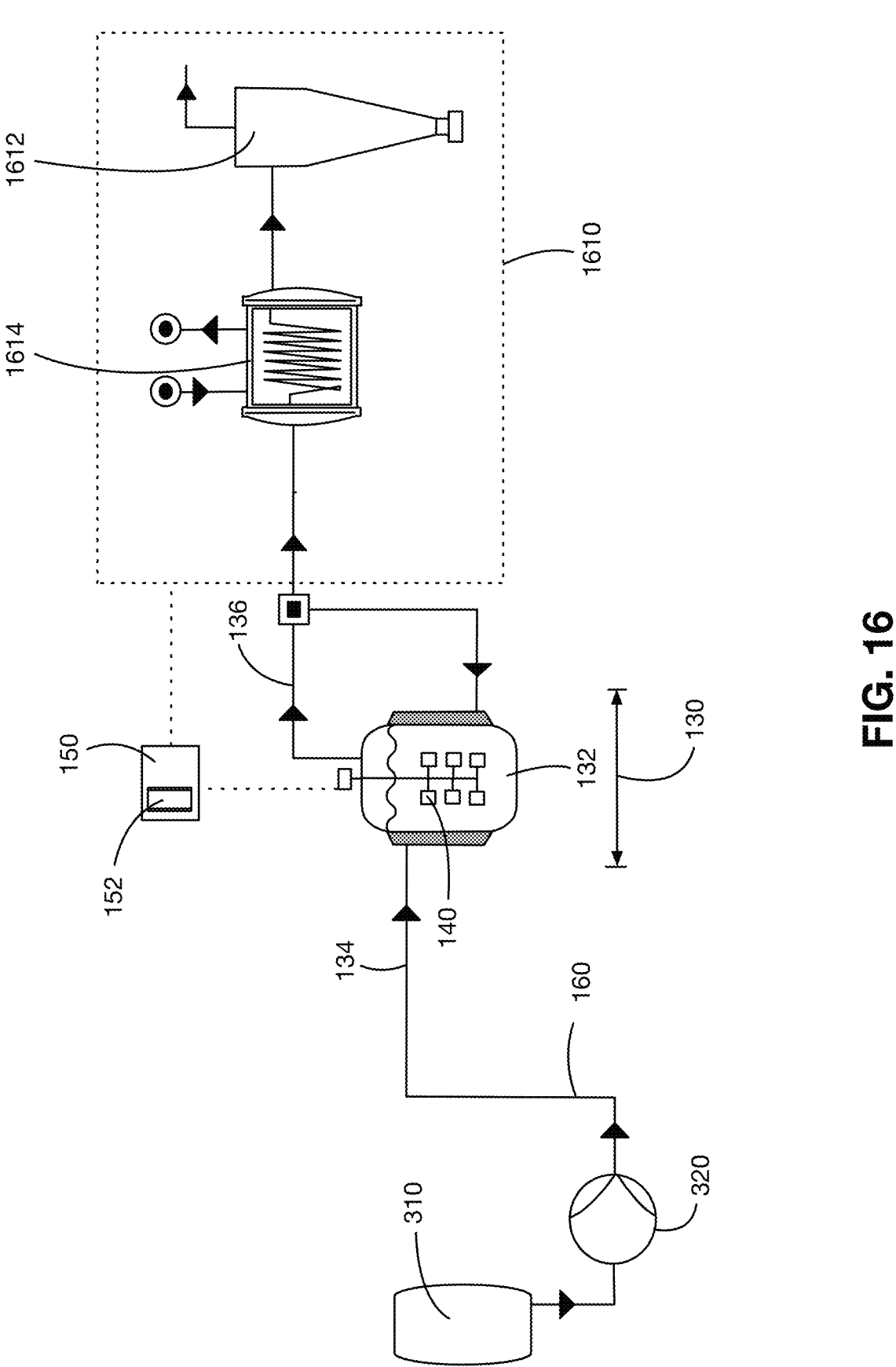
FIG. 16 shows a process control diagram of a waste conversion apparatus including a first embodiment of a post-processing system.

In an embodiment such as the embodiment provided in FIG. 16, the waste conversion apparatus 100 includes a post-processing system 1610 in fluid connection with the outlet of the reactor chamber 132. The control system 150 of the waste conversion apparatus 100 is connected to the post-processing system 1610.

In an embodiment, the at least one sensor element 910 of the control subsystem 900 includes at least one post-processing sensor, and the at least one control element 930 of the control subsystem includes at least one post-processing control element.

In a further embodiment, the control system 150 controls the post-processing system 1610 by adjusting the at least one post-processing control element based on a detected, actual composition of the at least one gaseous product (as detected by the output analysis system).

In an alternate embodiment, the control system 150 controls the post-processing system 1610 by adjusting the at least one post-processing control element based on a detected temperature of the at least one gaseous product (as detected by the output analysis system 210).

In an embodiment, the post-processing system 1610 includes a condenser unit in fluid connection with the outlet conduit of the reactor chamber 132, the at least one gaseous product from the reactor chamber 132 being passed through the at least one condenser unit to condense and form at least one liquid product from a portion of the at least one gaseous product.

In an embodiment such as the embodiment provided in FIG. 16, the post-processing system 1610 includes a heat exchanger unit 1614 in fluid connection with the outlet conduit 136 of the reactor chamber 132. The at least one gaseous product is passed through the heat exchanger unit 1614 for transferring an amount of excess heat to a working fluid of the heat exchanger unit 1614 such that the working fluid becomes at least partially vaporized. In this embodiment, the at least one control element of the post-processing system 1610 is any variable component of the heat exchanger unit 1614 such as a valve for regulating a flow rate of the working fluid in the heat exchanger unit 1614. In this embodiment, the post-processing system 1610 may also include a steam turbine for generating electricity, the turbine being in fluid connection with the heat exchanger unit 1614 such that the working fluid from the heat exchanger unit 1614 is fed to the turbine to drive a motion thereof.

In an embodiment such as the embodiment provided in FIG. 16, the post-processing system includes a cyclone separator unit 1612. The at least one gaseous product is passed through the cyclone separator unit 1612 to separate out undesirable particulate within the at least one gaseous product. In the specific embodiment provided in FIG. 16, the cyclone separator unit 1612 is in fluid connection with an outlet of the heat exchanger 1614 that is in fluid connection with the outlet conduit 136 of the reactor chamber 132.

Figure 17:
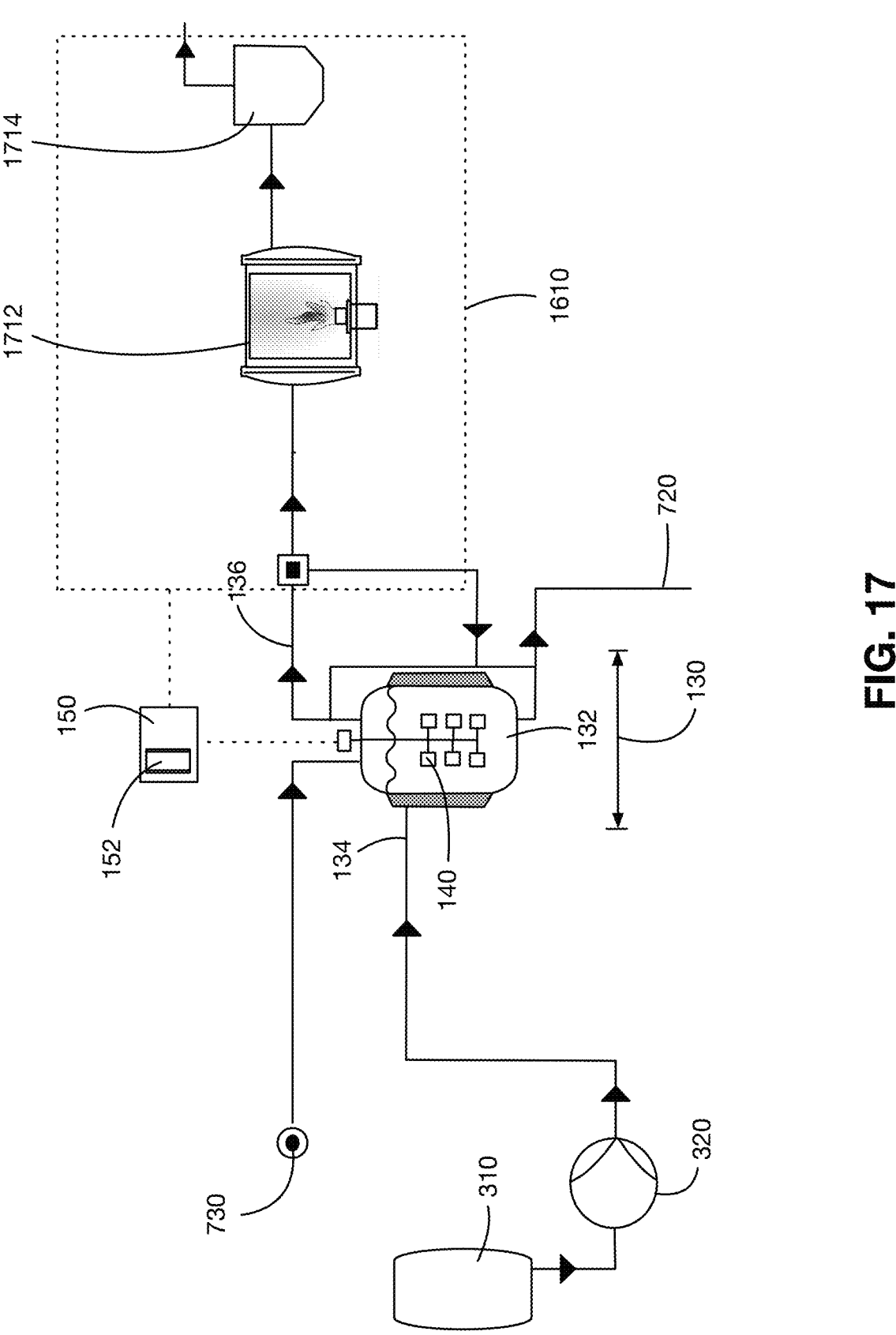
FIG. 17 shows a process control diagram of a waste conversion apparatus including a second embodiment of a post-processing system.

In an embodiment such as the embodiment provided in FIG. 17, the post-processing system 1610 includes an after-burning unit 1712 in fluid connection with the outlet conduit 136 of the reactor chamber 132. The at least one gaseous product is passed through after-burning unit 1712 to produce a purified version of the at least one gaseous product.

In an embodiment such as the embodiment provided in FIG. 17, the post-processing system 1610 includes a gas cooling and purification unit 1714. The at least one gaseous product is passed through the gas cooling purification unit 1714 to produce a purified version of the at least one gaseous product. In the specific embodiment provided in FIG. 17, the gas cooling and purification unit 1714 is in fluid connection with an outlet of the after-burning unit 1712 that is in fluid connection with the outlet of the reactor chamber 132.

In an additional embodiment, the purified version of the at least one gaseous product is an industrially useful chemical compound such as ammonia, hydrogen, or liquid hydrocarbons.

In an embodiment, the computer-executable instructions for implementing the processes of the control system 150 on the at least one processor 152 are provided separately from the control system, for example, on a computer-readable medium (such as, for example, an optical disk, a hard disk, a USB drive or a media card) or by making them available for downloading over a communications network, such as the Internet.

In embodiments in which the waste conversion apparatus 100 carries out gasification on the waste feedstock 110, the waste conversion apparatus could be referred to as a waste gasification apparatus, whether or not other steps such as pyrolysis are also carried out.

The above-described embodiments are intended to be examples of the present disclosure and alterations and modifications may be effected thereto, by those of skill in the art, without departing from the scope of the disclosure that is defined solely by the claims appended hereto.

What is claimed is:

1. An apparatus for plasma-based conversion of solid waste feedstock into hydrocarbon gaseous products using closed-loop control, the apparatus comprising:

a reactor vessel defining a reactor chamber including an inlet, at least one plasma forming device for generating a plasma arc within the reactor chamber and an outlet conduit for expelling at least one gaseous product from the reactor chamber;

a continuous feed-in unit positioned for feeding a supply of solid waste feedstock to the inlet of the reactor chamber;

a feedstock analysis system being positioned to collect and analyze a sample from the supply of solid waste feedstock fed along the continuous feed-in unit, the feedstock analysis system including at least one physicochemical sensor for detecting at least one physicochemical characteristic of the sample of solid waste feedstock, and at least one spectral sensor for detecting at least one spectral characteristic of the sample of solid waste feedstock; and a control system being connected to the feedstock analysis system and to the at least one plasma forming device of the reactor vessel, and including at least one processor programmed with computer executable instructions to:

characterize a composition of hydrocarbon-containing materials in the sample of solid waste feedstock based at least on the at least one physicochemical characteristic and at least one spectral characteristic detected by the feedstock analysis system; and control the at least one plasma forming device, based at least on the composition of hydrocarbon-containing materials in the sample of solid waste feedstock, to apply heat at a target temperature profile, for a target time interval, to the supply of solid-waste feedstock to form the at least one gaseous product.

2. The apparatus according to 1, wherein the target temperature profile and target time interval are determined by the control system based at least on the composition of hydrocarbon-containing materials characterized by the feedstock analysis system.

3. The apparatus according to claim 1, further comprising a pre-processing system connected for performing at least one pre-processing process on the supply of solid waste feedstock prior to the supply of solid waste feedstock being fed to the inlet of the reactor chamber.

4. The apparatus according to claim 3, wherein the at least one pre-processing process performed by the pre-processing system includes a granulating process that forms a granulated supply of solid-waste feedstock, granules of the granulated supply of solid-waste feedstock have a size in a range from 1 mm to 10 mm.

5. The apparatus according to claim 4, further comprising a post-processing system that includes least one condenser unit in fluid connection with the outlet conduit of the reactor chamber, the at least one gaseous product being passed through the at least one condenser unit to condense and form a liquid product from a portion of the at least one gaseous product.

6. The apparatus according to claim 5, wherein the post-processing system includes a heat exchanger unit in fluid connection with the outlet conduit of the reactor chamber, the at least one gaseous product being passed through the heat exchanger for transferring an amount of excess heat from the at least one gaseous product, to a working fluid of the heat exchanger unit such that the working fluid becomes at least partially vaporized; and a steam turbine for generating electricity, the turbine being in fluid connection with the heat exchanger unit such that the partially vaporized working fluid from the heat exchanger unit is fed to the turbine to drive the motion thereof.

7. The apparatus according to claim 1, wherein the at least one plasma-forming device is a direct-current plasma torch.

8. An apparatus for plasma-based conversion of solid waste feedstock into hydrocarbon gaseous products, the apparatus comprising:

a reactor vessel defining a reactor chamber including:

an inlet;

at least one plasma forming device for generating a plasma arc therewithin; and an outlet conduit for expelling at least one gaseous product from the reactor chamber, the at least one gaseous product having a target composition of hydrocarbon-containing materials;

a continuous feed-in unit positioned for feeding the supply of solid waste feedstock to the inlet of the reactor chamber;

an output analysis system including at least one gas composition sensor positioned to detect at least one physicochemical characteristic or at least one spectral characteristic of the at least one gaseous product from the reactor chamber; and a control system being connected to the output analysis system and the at least one plasma forming device and including at least one processor programmed with computer executable instructions to:

control the at least one plasma forming device to apply heat at a target temperature profile, for a target time interval, to the supply of solid-waste feedstock to form the at least one gaseous product having the target composition of hydrocarbon-containing materials;

determine an actual composition of the at least one gaseous product based on the at least one physicochemical characteristic or at least one spectral characteristic of the at least one gaseous product; and adjust at least one of the target time interval and the target temperature profile of heat applied by the at least one plasma forming device based on a detected difference between the target composition of the at least one gaseous product and the actual composition of the at least one gaseous product.

9. The apparatus according to claim 8, wherein a degree of adjusting of the at least one target time interval or the target temperature profile of heat applied by the at least one plasma forming devices is determined based on the detected difference between the target composition of the at least one gaseous product and the actual composition of the at least one gaseous product.

10. The apparatus according to claim 8, further comprising a pre-processing system connected for performing at least one pre-processing process on the supply of solid waste feedstock prior to the supply of solid waste feedstock being fed to the inlet of the reactor chamber.

11. The apparatus according to claim 10, wherein the at least one pre-processing process performed by the pre-processing system includes a granulating process that forms a granulated supply of solid-waste feedstock, granules of the granulated supply of solid-waste feedstock have a size in a range from 1 mm to 10 mm.

12. The apparatus according to claim 8, further comprising a post-processing system.

13. The apparatus according to claim 12, wherein the post-processing system includes least one condenser unit in fluid connection with the outlet conduit of the reactor chamber, the at least one gaseous product being passed through the at least one condenser unit to condense and form a liquid product from a portion of the at least one gaseous product.

14. The apparatus according to claim 12, wherein the post-processing system includes a heat exchanger unit in fluid connection with the outlet conduit of the reactor chamber, the at least one gaseous product being passed through the heat exchanger for transferring an amount of excess heat from the at least one gaseous product, to a working fluid of the heat exchanger unit such that the working fluid becomes at least partially vaporized; and a steam turbine for generating electricity, the turbine being in fluid connection with the heat exchanger unit such that the partially vaporized working fluid from the heat exchanger unit is fed to the turbine to drive the motion thereof.

15. The apparatus according to claim 8, wherein the at least one plasma-forming device is a direct-current plasma torch.

\* \* \* \* \*